United States Patent
Lindemulder et al.

(10) Patent No.: US 10,600,069 B2
(45) Date of Patent: *Mar. 24, 2020

(54) GIFT CARD EXCHANGE KIOSKS AND ASSOCIATED METHODS OF USE

(71) Applicant: CARDPOOL, INC., Irving, TX (US)

(72) Inventors: Elizabeth Jane Lindemulder, Chicago, IL (US); Sarah Christine Heffernan, Oak Park, IL (US); Walter Paulsen, Woodside, CA (US)

(73) Assignee: Cardpool, Inc., Irving, TX (US)

( * ) Notice: Subject to any disclaimer, the term of this patent is extended or adjusted under 35 U.S.C. 154(b) by 883 days.

This patent is subject to a terminal disclaimer.

(21) Appl. No.: 14/705,828

(22) Filed: May 6, 2015

(65) Prior Publication Data

US 2015/0254707 A1    Sep. 10, 2015

Related U.S. Application Data

(63) Continuation of application No. 13/286,971, filed on Nov. 1, 2011, now Pat. No. 9,064,268.
(Continued)

(51) Int. Cl.
*G06Q 30/00* (2012.01)
*G06Q 30/02* (2012.01)
(Continued)

(52) U.S. Cl.
CPC ......... *G06Q 30/0237* (2013.01); *G06Q 20/10* (2013.01); *G06Q 30/0641* (2013.01); *G07F 7/06* (2013.01); *G07F 17/42* (2013.01)

(58) Field of Classification Search
CPC .... G06Q 30/00; G06Q 30/0237; G06Q 20/10; G06Q 30/0641; G07F 7/06; G07F 17/42
See application file for complete search history.

(56) References Cited

U.S. PATENT DOCUMENTS

| 269,461 A | 12/1882 | Rakestraw |
| 446,303 A | 2/1891 | Thompson |

(Continued)

FOREIGN PATENT DOCUMENTS

| CA | 1053598 A1 | 5/1979 |
| CA | 2060630 A1 | 8/1992 |

(Continued)

OTHER PUBLICATIONS

No Author, "Swapagift.com Expands its 'Cash for Your Card' Program", http://www.prweb.com/releases/2003/12/prweb96305.htm, Dec. 31, 2003 (Year: 2003).*

(Continued)

*Primary Examiner* — Naeem U Haq
(74) *Attorney, Agent, or Firm* — Fish & Richardson P.C.

(57) ABSTRACT

The present disclosure is directed to gift card exchange kiosks and associated methods of use. In one embodiment, for example, a consumer operated kiosk can receive a gift card identifier associated with a gift card via a user interface and/or a card reader, verify the gift card's activation status and/or face value, and display exchange options for a consumer. The exchange options can include exchanging the gift card for cash or a redeemable cash voucher. The kiosk can also store exchanged gift cards for later sale at the kiosk or at a remote location.

20 Claims, 5 Drawing Sheets

Related U.S. Application Data (60) Provisional application No. 61/409,050, filed on Nov. 1, 2010.

(51) Int. Cl.
*G06Q 20/10* (2012.01)
*G06Q 30/06* (2012.01)
*G07F 17/42* (2006.01)
*G07F 7/06* (2006.01)

(56) References Cited

U.S. PATENT DOCUMENTS

| | | |
|---|---|---|
| 545,185 A | 8/1895 | Yost |
| 576,141 A | 2/1897 | Muenchinger |
| 1,010,993 A | 12/1911 | White |
| 1,234,707 A | 7/1917 | Whistler |
| 1,345,858 A | 7/1920 | Jenkins |
| 1,711,049 A | 4/1929 | Fonda et al. |
| 1,813,296 A | 7/1931 | Kidwell |
| 1,847,940 A | 3/1932 | Giles |
| 1,945,948 A | 2/1934 | Morin |
| 2,014,505 A | 9/1935 | Patche |
| 2,317,351 A | 4/1943 | Hovey |
| 2,461,314 A | 2/1949 | Davis et al. |
| 2,569,360 A | 9/1951 | Weingart |
| 2,644,470 A | 7/1953 | Labbe |
| 2,865,561 A | 12/1958 | Rosapepe |
| 2,881,774 A | 4/1959 | Labbe |
| 2,960,377 A | 11/1960 | Simjian |
| 3,009,555 A | 11/1961 | Seckula |
| 3,048,251 A | 8/1962 | Bower |
| 3,056,132 A | 9/1962 | Simjian |
| 3,065,467 A | 11/1962 | Prevost |
| 3,132,654 A | 5/1964 | Adams |
| 3,173,742 A | 3/1965 | Simjian |
| 3,196,257 A | 7/1965 | Buchholtz et al. |
| 3,227,363 A | 1/1966 | Hecker et al. |
| 3,286,805 A | 11/1966 | New |
| 3,396,737 A | 8/1968 | Picollo |
| 3,415,348 A | 12/1968 | Wahlberg |
| 3,599,771 A | 8/1971 | Hinterstocker |
| 3,603,327 A | 9/1971 | Buchholz et al. |
| 3,709,145 A | 1/1973 | Williamson |
| 3,763,871 A | 10/1973 | Jobst et al. |
| 3,788,440 A | 1/1974 | Propice et al. |
| 3,791,574 A | 2/1974 | Picquot |
| 3,815,717 A | 6/1974 | Arseneau |
| 3,941,226 A | 3/1976 | Drakes |
| 3,960,293 A | 6/1976 | Sweet et al. |
| 3,969,584 A | 7/1976 | Miller et al. |
| 3,982,620 A | 9/1976 | Kortenhaus |
| 3,984,660 A | 10/1976 | Oka et al. |
| 3,998,237 A | 12/1976 | Kressin et al. |
| 4,014,424 A | 3/1977 | Hall |
| 4,036,242 A | 7/1977 | Breitenstein et al. |
| 4,058,954 A | 11/1977 | Asami |
| 4,059,122 A | 11/1977 | Kinoshita |
| 4,092,990 A | 6/1978 | Bayne |
| 4,099,722 A | 7/1978 | Rodesch et al. |
| 4,100,925 A | 7/1978 | Fukunaga |
| 4,106,610 A | 8/1978 | Heiman |
| 4,124,109 A | 11/1978 | Bissell et al. |
| 4,141,372 A | 2/1979 | Gdanski |
| 4,167,949 A | 9/1979 | Hashimoto et al. |
| 4,172,462 A | 10/1979 | Uchida et al. |
| 4,225,056 A | 9/1980 | Flubacker |
| 4,228,811 A | 10/1980 | Tanaka et al. |
| 4,230,213 A | 10/1980 | Spring |
| 4,249,552 A | 2/1981 | Margolin et al. |
| 4,264,282 A | 4/1981 | Crago |
| 4,266,121 A | 5/1981 | Hirose et al. |
| 4,275,751 A | 6/1981 | Bergman |
| 4,306,644 A | 12/1981 | Rockola et al. |
| 4,321,672 A | 3/1982 | Braun et al. |
| 4,326,620 A | 4/1982 | Felix et al. |
| 4,346,798 A | 8/1982 | Agey |
| 4,356,829 A | 11/1982 | Furuya |
| 4,360,034 A | 11/1982 | Davila et al. |
| 4,369,442 A | 1/1983 | Werth et al. |
| 4,369,800 A | 1/1983 | Watanabe et al. |
| 4,374,557 A | 2/1983 | Sugimoto et al. |
| 4,376,442 A | 3/1983 | Gomez et al. |
| 4,380,316 A | 4/1983 | Glinka et al. |
| 4,383,540 A | 5/1983 | De Meyer et al. |
| 4,398,550 A | 8/1983 | Shireman |
| 4,412,292 A | 10/1983 | Sedam et al. |
| 4,412,607 A | 11/1983 | Collins |
| 4,434,359 A | 2/1984 | Watanabe et al. |
| 4,436,103 A | 3/1984 | Dick |
| 4,442,850 A | 4/1984 | Austin et al. |
| 4,447,714 A | 5/1984 | Lundblad et al. |
| 4,503,963 A | 3/1985 | Steiner |
| 4,504,357 A | 3/1985 | Holbein et al. |
| 4,506,685 A | 3/1985 | Childers et al. |
| 4,509,122 A | 4/1985 | Agnew et al. |
| 4,509,633 A | 4/1985 | Chow |
| 4,542,817 A | 9/1985 | Paulson |
| 4,543,969 A | 10/1985 | Rasmussen |
| 4,554,446 A | 11/1985 | Murphy |
| 4,555,618 A | 11/1985 | Riskin |
| 4,558,711 A | 12/1985 | Yoshiaki et al. |
| 4,577,744 A | 3/1986 | Doucet et al. |
| 4,587,984 A | 5/1986 | Levasseur et al. |
| 4,597,487 A | 7/1986 | Crosby et al. |
| 4,598,378 A | 7/1986 | Giacomo |
| 4,611,205 A | 9/1986 | Eglise et al. |
| 4,616,323 A | 10/1986 | Hayashi |
| 4,616,776 A | 10/1986 | Blumenthal et al. |
| 4,620,559 A | 11/1986 | Childers et al. |
| 4,622,456 A | 11/1986 | Naruto et al. |
| 4,641,239 A | 2/1987 | Takesako |
| 4,672,377 A | 6/1987 | Murphy et al. |
| 4,674,055 A | 6/1987 | Ogaki et al. |
| 4,677,565 A | 6/1987 | Ogaki et al. |
| 4,694,845 A | 9/1987 | Zay |
| 4,706,577 A | 11/1987 | Jones et al. |
| 4,706,795 A | 11/1987 | Mikami et al. |
| 4,716,799 A | 1/1988 | Hartmann |
| 4,723,212 A | 2/1988 | Mindrum et al. |
| 4,733,765 A | 3/1988 | Watanabe |
| 4,753,625 A | 6/1988 | Okada |
| 4,767,917 A | 8/1988 | Ushikubo |
| 4,775,353 A | 10/1988 | Childers et al. |
| 4,775,354 A | 10/1988 | Rasmussen et al. |
| 4,809,837 A | 3/1989 | Hayashi et al. |
| 4,814,589 A | 3/1989 | Storch et al. |
| 4,817,043 A | 3/1989 | Brown |
| 4,831,374 A | 5/1989 | Masel |
| 4,833,308 A | 5/1989 | Humble |
| 4,882,675 A | 11/1989 | Nichtberger et al. |
| 4,883,158 A | 11/1989 | Kobayashi et al. |
| 4,884,672 A | 12/1989 | Parker |
| 4,896,791 A | 1/1990 | Smith |
| 4,898,564 A | 2/1990 | Gunn et al. |
| 4,910,672 A | 3/1990 | Off et al. |
| 4,915,205 A | 4/1990 | Reid et al. |
| 4,921,463 A | 5/1990 | Primdahl et al. |
| 4,936,436 A | 6/1990 | Keltner |
| 4,953,086 A | 8/1990 | Fukatsu et al. |
| 4,959,624 A | 9/1990 | Higgins et al. |
| 4,963,118 A | 10/1990 | Gunn et al. |
| 4,964,495 A | 10/1990 | Rasmussen |
| 4,969,549 A | 11/1990 | Eglise et al. |
| 4,977,502 A | 12/1990 | Baker et al. |
| 4,978,322 A | 12/1990 | Paulsen |
| 4,995,848 A | 2/1991 | Goh |
| 4,997,406 A | 3/1991 | Horiguchi et al. |
| 5,010,238 A | 4/1991 | Kadono et al. |
| 5,021,967 A | 6/1991 | Smith |
| 5,022,889 A | 6/1991 | Ristvedt et al. |
| 5,025,139 A | 6/1991 | Halliburton |
| 5,027,937 A | 7/1991 | Parish et al. |
| 5,039,848 A | 8/1991 | Stoken |

(56) References Cited

U.S. PATENT DOCUMENTS

| | | |
|---|---|---|
| 5,040,657 A | 8/1991 | Gunn et al. |
| 5,055,657 A | 10/1991 | Miller et al. |
| 5,056,644 A | 10/1991 | Parker |
| 5,073,767 A | 12/1991 | Holmes et al. |
| 5,083,765 A | 1/1992 | Kringel |
| 5,083,814 A | 1/1992 | Guinta et al. |
| 5,088,587 A | 2/1992 | Goodrich et al. |
| 5,091,713 A | 2/1992 | Horne et al. |
| 5,098,339 A | 3/1992 | Dabrowski |
| 5,098,340 A | 3/1992 | Abe |
| 5,100,367 A | 3/1992 | Abe et al. |
| 5,111,927 A | 5/1992 | Schulze |
| 5,114,381 A | 5/1992 | Ueda et al. |
| 5,135,433 A | 8/1992 | Watanabe et al. |
| 5,163,868 A | 11/1992 | Adams |
| 5,173,851 A | 12/1992 | Off et al. |
| 5,174,608 A | 12/1992 | Benardelli et al. |
| 5,183,142 A | 2/1993 | Latchinian et al. |
| 5,195,626 A | 3/1993 | Le Hong et al. |
| 5,197,588 A | 3/1993 | Furuya et al. |
| 5,201,396 A | 4/1993 | Chalabian et al. |
| 5,219,059 A | 6/1993 | Furuya et al. |
| 5,226,519 A | 7/1993 | DeWoolfson |
| 5,227,874 A | 7/1993 | Von Kohorn |
| 5,227,966 A | 7/1993 | Ichiba |
| 5,236,339 A | 8/1993 | Nishiumi et al. |
| 5,251,738 A | 10/1993 | Dabrowski |
| 5,252,811 A | 10/1993 | Henochowicz et al. |
| 5,265,033 A | 11/1993 | Vajk et al. |
| 5,293,981 A | 3/1994 | Abe et al. |
| 5,299,672 A | 4/1994 | Nishiumi et al. |
| 5,299,673 A | 4/1994 | Wu |
| 5,302,811 A | 4/1994 | Fukatsu et al. |
| 5,305,195 A | 4/1994 | Singer |
| 5,316,120 A | 5/1994 | Ibarrola |
| 5,316,517 A | 5/1994 | Chiba et al. |
| 5,317,135 A | 5/1994 | Finocchio |
| 5,321,242 A | 6/1994 | Heath |
| 5,328,014 A | 7/1994 | Nishiumi et al. |
| 5,330,041 A | 7/1994 | Dobbins et al. |
| 5,350,906 A | 9/1994 | Brody et al. |
| 5,355,988 A | 10/1994 | Shirasawa |
| 5,365,046 A | 11/1994 | Haymann |
| 5,374,814 A | 12/1994 | Kako et al. |
| 5,388,680 A | 2/1995 | Hird et al. |
| RE34,915 E | 4/1995 | Nichtberger et al. |
| 5,409,092 A | 4/1995 | Itako et al. |
| 5,429,222 A | 7/1995 | Delay et al. |
| 5,435,777 A | 7/1995 | Takatani et al. |
| 5,440,108 A | 8/1995 | Tran et al. |
| 5,441,139 A | 8/1995 | Abe et al. |
| 5,449,058 A | 9/1995 | Kotler et al. |
| 5,457,305 A | 10/1995 | Akel |
| 5,469,951 A | 11/1995 | Takemoto et al. |
| 5,479,507 A | 12/1995 | Anderson |
| 5,483,363 A | 1/1996 | Holmes et al. |
| 5,506,393 A | 4/1996 | Ziarno |
| 5,511,114 A | 4/1996 | Stimson et al. |
| 5,513,738 A | 5/1996 | Hird et al. |
| 5,531,640 A | 7/1996 | Inoue |
| 5,554,070 A | 9/1996 | Takatoshi et al. |
| 5,555,497 A | 9/1996 | Helbling |
| 5,560,467 A | 10/1996 | Takemoto et al. |
| 5,564,546 A | 10/1996 | Molbak et al. |
| 5,564,974 A | 10/1996 | Mazur et al. |
| 5,577,109 A | 11/1996 | Beshear et al. |
| 5,577,959 A | 11/1996 | Takemoto et al. |
| 5,620,079 A | 4/1997 | Molback |
| 5,637,845 A | 6/1997 | Kolls |
| 5,650,604 A | 7/1997 | Marcous et al. |
| 5,652,421 A | 7/1997 | Veeneman et al. |
| 5,661,285 A | 8/1997 | Elrick et al. |
| 5,663,546 A | 9/1997 | Cucinotta et al. |
| 5,665,952 A | 9/1997 | Ziarno |
| D385,488 S | 10/1997 | Smith et al. |
| 5,679,070 A | 10/1997 | Ishida et al. |
| 5,696,908 A | 12/1997 | Muehlberger et al. |
| 5,699,328 A | 12/1997 | Ishizaki et al. |
| 5,721,768 A | 2/1998 | Stimson et al. |
| 5,732,398 A | 3/1998 | Tagawa |
| 5,734,722 A | 3/1998 | Halpern |
| 5,743,429 A | 4/1998 | Morofsky |
| 5,746,299 A | 5/1998 | Molbak |
| 5,746,322 A | 5/1998 | LaVeine et al. |
| 5,748,908 A | 5/1998 | Yu |
| 5,777,305 A | 7/1998 | Smith et al. |
| 5,799,767 A | 9/1998 | Molback |
| 5,835,061 A | 11/1998 | Stewart |
| 5,839,956 A | 11/1998 | Takemoto et al. |
| 5,842,916 A | 12/1998 | Gerrity et al. |
| 5,868,236 A | 2/1999 | Rademacher |
| 5,880,444 A | 3/1999 | Shibata et al. |
| 5,903,880 A | 5/1999 | Biffar |
| 5,905,810 A | 5/1999 | Jones et al. |
| 5,909,792 A | 6/1999 | Gerlier et al. |
| 5,909,793 A | 6/1999 | Beach et al. |
| 5,909,794 A | 6/1999 | Molback et al. |
| 5,943,423 A | 8/1999 | Muftic |
| 5,943,655 A | 8/1999 | Jacobson |
| 5,953,504 A | 9/1999 | Sokal et al. |
| 5,956,697 A | 9/1999 | Usui |
| 5,964,830 A | 10/1999 | Durrett |
| 5,974,146 A | 10/1999 | Randle et al. |
| 5,982,918 A | 11/1999 | Mennie et al. |
| 5,988,348 A | 11/1999 | Martin |
| 5,991,413 A | 11/1999 | Arditti et al. |
| 6,014,636 A | 1/2000 | Reeder |
| 6,014,646 A | 1/2000 | Vallee et al. |
| 6,017,063 A | 1/2000 | Nilssen |
| 6,021,883 A | 2/2000 | Casanova et al. |
| 6,028,920 A | 2/2000 | Carson |
| 6,047,807 A | 4/2000 | Molbak |
| 6,047,808 A | 4/2000 | Neubarth et al. |
| 6,053,807 A | 4/2000 | Metzger et al. |
| 6,068,550 A | 5/2000 | Breitholtz et al. |
| 6,081,791 A | 6/2000 | Clark |
| 6,105,007 A | 8/2000 | Norris |
| 6,105,008 A | 8/2000 | Davis et al. |
| 6,105,009 A | 8/2000 | Cuervo |
| 6,110,044 A | 8/2000 | Stern |
| 6,116,402 A | 9/2000 | Beach et al. |
| 6,119,099 A | 9/2000 | Walker et al. |
| 6,119,945 A | 9/2000 | Muller et al. |
| 6,128,402 A | 10/2000 | Jones et al. |
| 6,129,275 A | 10/2000 | Urquhart et al. |
| 6,138,106 A | 10/2000 | Walker et al. |
| 6,144,946 A | 11/2000 | Iwamura et al. |
| 6,152,365 A | 11/2000 | Kolls |
| 6,185,545 B1 | 2/2001 | Resnick et al. |
| 6,193,155 B1 | 2/2001 | Walker et al. |
| 6,196,371 B1 | 3/2001 | Martin et al. |
| 6,227,343 B1 | 5/2001 | Neathway et al. |
| 6,230,928 B1 | 5/2001 | Hanna et al. |
| 6,233,564 B1 | 5/2001 | Schulze |
| 6,243,450 B1 | 6/2001 | Jansen et al. |
| 6,243,687 B1 | 6/2001 | Powell |
| 6,264,545 B1 | 7/2001 | Magee |
| 6,267,292 B1 | 7/2001 | Walker |
| 6,269,349 B1 | 7/2001 | Aieta et al. |
| 6,289,324 B1 | 9/2001 | Kawan |
| 6,292,211 B1 | 9/2001 | Pena |
| 6,308,887 B1 | 10/2001 | Korman et al. |
| 6,318,536 B1 | 11/2001 | Korman et al. |
| 6,318,537 B1 | 11/2001 | Jones et al. |
| 6,330,544 B1 | 12/2001 | Walker et al. |
| 6,349,972 B1 | 2/2002 | Geiger et al. |
| 6,363,164 B1 | 3/2002 | Jones et al. |
| 6,370,240 B1 | 4/2002 | Woynoski et al. |
| 6,370,514 B1 | 4/2002 | Messner et al. |
| 6,375,080 B1 | 4/2002 | Cremonese |
| 6,382,504 B1 * | 5/2002 | Lyons .................. G06K 15/00 235/379 |
| 6,390,269 B1 | 5/2002 | Billington et al. |
| 6,401,010 B1 | 6/2002 | Takahashi |

(56) References Cited

U.S. PATENT DOCUMENTS

| | | |
|---|---|---|
| 6,405,182 B1 | 6/2002 | Cuervo |
| 6,415,262 B1 | 7/2002 | Walker et al. |
| 6,456,981 B1 | 9/2002 | Dejaeger et al. |
| 6,460,357 B1 | 10/2002 | Doi et al. |
| 6,484,863 B1 | 11/2002 | Molbak |
| 6,494,776 B1 | 12/2002 | Molbak |
| 6,499,052 B1 | 12/2002 | Hoang et al. |
| 6,502,745 B1 | 1/2003 | Stimson et al. |
| 6,505,774 B1 | 1/2003 | Fulcher et al. |
| 6,536,037 B1 | 3/2003 | Guheen et al. |
| 6,554,184 B1 | 4/2003 | Amos |
| 6,575,361 B1 | 6/2003 | Graves et al. |
| 6,575,362 B1 | 6/2003 | Bator et al. |
| 6,594,644 B1 | 7/2003 | Van Dusen et al. |
| 6,607,136 B1 | 8/2003 | Altman et al. |
| 6,628,934 B2 | 9/2003 | Rosenberg et al. |
| 6,637,576 B1 | 10/2003 | Jones et al. |
| 6,659,259 B2 | 12/2003 | Knox et al. |
| 6,661,910 B2 | 12/2003 | Jones et al. |
| 6,694,300 B1 | 2/2004 | Walker et al. |
| 6,704,039 B2 | 3/2004 | Pena |
| 6,705,448 B1 | 3/2004 | Steel et al. |
| 6,736,251 B2 | 5/2004 | Molbak |
| 6,745,022 B2 | 6/2004 | Knox |
| 6,748,067 B2 | 6/2004 | Malik |
| 6,748,101 B1 | 6/2004 | Jones et al. |
| 6,758,316 B2 | 7/2004 | Molbak |
| 6,772,146 B2 | 8/2004 | Khemlani et al. |
| 6,778,693 B2 | 8/2004 | Jones et al. |
| 6,799,084 B2 | 9/2004 | Grobler |
| 6,823,172 B1 | 11/2004 | Forrest |
| 6,829,596 B1 | 12/2004 | Frazee |
| 6,854,581 B2 | 2/2005 | Molbak |
| 6,857,562 B2 | 2/2005 | Sasaki |
| 6,918,537 B2 | 7/2005 | Graves et al. |
| 6,934,529 B2 | 8/2005 | Bagoren et al. |
| 6,945,457 B1 | 9/2005 | Barcelou |
| 6,960,986 B2 | 11/2005 | Asama et al. |
| 6,973,172 B1 | 12/2005 | Bitove et al. |
| 6,973,443 B2 | 12/2005 | Drummond et al. |
| 6,976,570 B2 | 12/2005 | Molbak |
| 6,999,569 B2 | 2/2006 | Risafi et al. |
| 7,006,993 B1 | 2/2006 | Cheong et al. |
| 7,028,827 B1 | 4/2006 | Molbak et al. |
| 7,028,891 B2 | 4/2006 | O'Neal |
| 7,039,603 B2 | 5/2006 | Walker et al. |
| 7,054,842 B2 | 5/2006 | James et al. |
| 7,058,581 B1 | 6/2006 | Young |
| 7,083,084 B2 | 8/2006 | Graves et al. |
| 7,093,761 B2 | 8/2006 | Smith et al. |
| 7,113,929 B1 | 9/2006 | Beach et al. |
| 7,131,580 B2 | 11/2006 | Molbak |
| 7,156,300 B1 | 1/2007 | Dentlinger |
| 7,168,615 B2 | 1/2007 | Smith |
| 7,184,980 B2 | 2/2007 | Allen-Rouman et al. |
| 7,209,889 B1 | 4/2007 | Whitfield |
| 7,249,054 B2 | 7/2007 | Keil |
| 7,251,626 B2 | 7/2007 | Blackson et al. |
| 7,252,226 B2 | 8/2007 | Risafi et al. |
| 7,255,268 B2 | 8/2007 | Dentlinger |
| 7,266,533 B2 | 9/2007 | Yoder et al. |
| 7,287,005 B1 | 10/2007 | Bruecken et al. |
| 7,303,119 B2 | 12/2007 | Molbak |
| 7,311,249 B2 | 12/2007 | Smith et al. |
| 7,313,546 B2 | 12/2007 | Alarcom-Luther et al. |
| 7,328,190 B2 | 2/2008 | Smith et al. |
| 7,333,955 B2 | 2/2008 | Graves et al. |
| RE40,186 E | 3/2008 | Walker et al. |
| 7,343,349 B2 | 3/2008 | Ranzini et al. |
| 7,349,566 B2 | 3/2008 | Jones et al. |
| 7,356,507 B2 | 4/2008 | Bezos et al. |
| 7,398,225 B2 | 7/2008 | Voltmer et al. |
| 7,426,493 B2 | 9/2008 | Takeshima et al. |
| 7,473,177 B2 | 1/2009 | Friesen et al. |
| 7,505,941 B2 | 3/2009 | Bishop et al. |
| 7,522,716 B2 | 4/2009 | Paschini |
| 7,527,193 B2 | 5/2009 | Molbak |
| 7,529,563 B1 | 5/2009 | Pitroda |
| 7,630,926 B2 | 12/2009 | Chakiris et al. |
| 7,634,425 B2 | 12/2009 | Satomi et al. |
| 7,647,259 B2 | 1/2010 | De Fabrega |
| 7,653,599 B2 | 1/2010 | Doran et al. |
| 7,660,767 B1 | 2/2010 | Schultz et al. |
| 7,676,431 B2 | 3/2010 | Burney et al. |
| 7,778,456 B2 | 8/2010 | Jones et al. |
| 7,780,075 B2 | 8/2010 | Cooper et al. |
| 7,865,432 B2 | 1/2011 | Doran et al. |
| 7,865,447 B2 | 1/2011 | Rosenhaft et al. |
| 7,874,478 B2 | 1/2011 | Molbak |
| 7,904,565 B2 | 3/2011 | Holden et al. |
| 7,971,699 B2 | 7/2011 | Molbak |
| 8,005,425 B2 | 8/2011 | Defosse et al. |
| 8,024,272 B2 | 9/2011 | Doran et al. |
| 8,033,375 B2 | 10/2011 | Doran et al. |
| 8,082,195 B2 | 12/2011 | Enzaldo |
| 8,083,133 B2 | 12/2011 | Seifert et al. |
| 8,103,586 B2 | 1/2012 | Doran et al. |
| 8,152,060 B2 | 4/2012 | Wolfe et al. |
| 8,152,061 B2 | 4/2012 | Wolfe et al. |
| 8,175,965 B2 | 5/2012 | Moore et al. |
| 8,229,851 B2 | 7/2012 | Doran et al. |
| 8,332,313 B2 | 12/2012 | Doran et al. |
| 8,438,073 B2 | 5/2013 | White |
| 8,447,650 B2 | 5/2013 | Postrel |
| 8,485,890 B2 | 7/2013 | Gagner et al. |
| 8,489,452 B1 | 7/2013 | Mellas et al. |
| 8,494,956 B2 | 7/2013 | Tulluri et al. |
| 8,500,007 B2 | 8/2013 | Wolfe et al. |
| 8,503,641 B2 | 8/2013 | Bushey |
| 8,515,808 B2 | 8/2013 | Postrel |
| 8,528,814 B2 | 9/2013 | Wolfe |
| 8,528,828 B2 | 9/2013 | Fleischer et al. |
| 8,533,036 B2 | 9/2013 | Shukla et al. |
| 8,533,037 B2 | 9/2013 | Postrel |
| 8,556,707 B2 | 10/2013 | Potts et al. |
| 8,566,169 B2 | 10/2013 | Bohanan et al. |
| 8,571,983 B1 | 10/2013 | Blackhurst et al. |
| 8,589,267 B2 | 11/2013 | Hurst |
| 8,589,297 B2 | 11/2013 | Enzaldo |
| 8,595,074 B2 | 11/2013 | Sharma et al. |
| 8,600,807 B1 | 12/2013 | Postrel |
| 8,602,297 B2 | 12/2013 | Wilen |
| 8,612,290 B2 | 12/2013 | Postrel |
| 8,631,999 B2 | 1/2014 | Wolfe et al. |
| 8,660,944 B2 | 2/2014 | Liu et al. |
| 8,668,146 B1 | 3/2014 | McGhie et al. |
| 8,675,840 B2 | 3/2014 | Risafi et al. |
| 8,676,672 B2 | 3/2014 | Nelsen |
| 8,701,982 B2 | 4/2014 | Yankovich et al. |
| 8,701,991 B2 | 4/2014 | Wolfe |
| 8,712,854 B1 | 4/2014 | Rafferty et al. |
| 8,725,564 B2 | 5/2014 | Postrel |
| 8,733,637 B1 | 5/2014 | Cedeno |
| 8,751,294 B2 | 6/2014 | Bhattacharya et al. |
| 8,762,278 B2 | 6/2014 | Miller et al. |
| 8,820,634 B2 | 9/2014 | Kelly et al. |
| 8,874,467 B2 | 10/2014 | Yahn et al. |
| 8,887,999 B2 | 11/2014 | Kelly et al. |
| 8,967,324 B2 | 3/2015 | White et al. |
| 8,973,819 B2 * | 3/2015 | Blackhurst ............ G06Q 20/387 235/375 |
| 9,002,737 B2 | 4/2015 | Wilen |
| 9,064,268 B2 | 6/2015 | Larrick et al. |
| 2001/0001856 A1 | 5/2001 | Gould et al. |
| 2001/0007098 A1 | 7/2001 | Hinrichs et al. |
| 2001/0007983 A1 | 7/2001 | Lee |
| 2001/0011680 A1 | 8/2001 | Soltesz et al. |
| 2001/0023409 A1 | 9/2001 | Keil |
| 2001/0029484 A1 | 10/2001 | Schultz et al. |
| 2001/0051902 A1 | 12/2001 | Messner |
| 2002/0026423 A1 | 2/2002 | Maritzen et al. |
| 2002/0032605 A1 | 3/2002 | Lee |
| 2002/0032641 A1 | 3/2002 | Mendiola et al. |
| 2002/0046341 A1 | 4/2002 | Kazaks et al. |

(56) References Cited

U.S. PATENT DOCUMENTS

| | | |
|---|---|---|
| 2002/0065724 A1 | 5/2002 | Tsuruda |
| 2002/0072974 A1 | 6/2002 | Pugliese, III et al. |
| 2002/0082962 A1 | 6/2002 | Farris et al. |
| 2002/0085037 A1 | 7/2002 | Leavitt et al. |
| 2002/0087462 A1 | 7/2002 | Seifert et al. |
| 2002/0091603 A1 | 7/2002 | Steiger, Jr. et al. |
| 2002/0100660 A1 | 8/2002 | Stieber et al. |
| 2002/0107738 A1 | 8/2002 | Beach et al. |
| 2002/0112162 A1 | 8/2002 | Cocotis et al. |
| 2002/0147683 A1 | 10/2002 | Capobianco et al. |
| 2002/0156676 A1 | 10/2002 | Ahrens et al. |
| 2002/0162895 A1 | 11/2002 | Neto |
| 2002/0174235 A1 | 11/2002 | Likourezos |
| 2002/0188511 A1 | 12/2002 | Johnson et al. |
| 2002/0194122 A1 | 12/2002 | Knox et al. |
| 2003/0024979 A1 | 2/2003 | Hansen et al. |
| 2003/0046231 A1 | 3/2003 | Wu |
| 2003/0046249 A1 | 3/2003 | Wu |
| 2003/0081824 A1 | 5/2003 | Mennie et al. |
| 2003/0149662 A1 | 8/2003 | Shore |
| 2003/0168508 A1 | 9/2003 | Daellenbach et al. |
| 2003/0173405 A1 | 9/2003 | Wilz, Sr. et al. |
| 2003/0233318 A1 | 12/2003 | King et al. |
| 2004/0024700 A1 | 2/2004 | Petigny |
| 2004/0088252 A1 | 5/2004 | Jenny et al. |
| 2005/0038737 A1 | 2/2005 | Norris |
| 2005/0108104 A1 | 5/2005 | Woo et al. |
| 2005/0108155 A1 | 5/2005 | Gallagher et al. |
| 2005/0144074 A1 | 6/2005 | Fredregill et al. |
| 2005/0171902 A1 | 8/2005 | Nguyen |
| 2005/0203835 A1 | 9/2005 | Nhaissi et al. |
| 2005/0203836 A1 | 9/2005 | Woodward et al. |
| 2005/0227769 A1 | 10/2005 | Morrow et al. |
| 2006/0089908 A1 | 4/2006 | Keohane et al. |
| 2006/0131387 A1 | 6/2006 | Hansen et al. |
| 2006/0207856 A1 | 9/2006 | Dean et al. |
| 2006/0249568 A1 | 11/2006 | Scanlon et al. |
| 2006/0293965 A1 | 12/2006 | Burton |
| 2007/0089064 A1 | 4/2007 | Facemire et al. |
| 2007/0125620 A1 | 6/2007 | Sorenson et al. |
| 2007/0234223 A1 | 10/2007 | Leavitt et al. |
| 2008/0052182 A1 | 2/2008 | Marshall et al. |
| 2008/0072145 A1 | 3/2008 | Blanchard et al. |
| 2008/0082972 A1 | 4/2008 | De Sutter et al. |
| 2008/0162299 A1 | 7/2008 | Gusler et al. |
| 2008/0163079 A1 | 7/2008 | Haug et al. |
| 2008/0172623 A1 | 7/2008 | Roche et al. |
| 2008/0288400 A1 | 11/2008 | Panthaki et al. |
| 2009/0240624 A1 | 9/2009 | James et al. |
| 2009/0242626 A1 | 10/2009 | Jones et al. |
| 2009/0265269 A1 | 10/2009 | Stoecker |
| 2009/0302103 A1 | 12/2009 | Kolinski-Schultz et al. |
| 2009/0307622 A1 | 12/2009 | Jalon et al. |
| 2009/0313358 A1 | 12/2009 | Shepherd et al. |
| 2010/0057612 A1 | 3/2010 | Wagenhals et al. |
| 2010/0063906 A1 | 3/2010 | Nelsen et al. |
| 2010/0131413 A1 | 5/2010 | Kranzley et al. |
| 2010/0198726 A1 | 8/2010 | Doran et al. |
| 2010/0200654 A1 | 8/2010 | Wolfe et al. |
| 2010/0217679 A1 | 8/2010 | Eckstein |
| 2011/0184834 A1 | 7/2011 | Perrochon et al. |
| 2011/0208637 A1 | 8/2011 | Wakita et al. |
| 2011/0225063 A1 | 9/2011 | Grunski et al. |
| 2011/0238549 A1 | 9/2011 | Poon |
| 2011/0282784 A1 | 11/2011 | Nelsen |
| 2012/0059736 A1 | 3/2012 | Bhattacharya et al. |
| 2012/0109787 A1 | 5/2012 | Larrick et al. |
| 2012/0124496 A1 | 5/2012 | Rose et al. |
| 2012/0137235 A1 | 5/2012 | T S et al. |
| 2012/0143705 A1 | 6/2012 | Bhattacharya et al. |
| 2012/0156976 A1 | 6/2012 | Blake et al. |
| 2012/0173351 A1 | 7/2012 | Hanson et al. |
| 2012/0259698 A1 | 10/2012 | Yurow et al. |
| 2012/0310848 A1 | 12/2012 | Gao et al. |
| 2012/0323787 A1 | 12/2012 | Nelsen |
| 2013/0065683 A1 | 3/2013 | Yoro |
| 2013/0066735 A1 | 3/2013 | Llach |
| 2013/0080235 A1 | 3/2013 | Wolfe |
| 2013/0091055 A1 | 4/2013 | Doran et al. |
| 2013/0144732 A1 | 6/2013 | Rothschild |
| 2013/0159130 A1 | 6/2013 | Gaur et al. |
| 2013/0161153 A1 | 6/2013 | Saez et al. |
| 2013/0191178 A1 | 7/2013 | Thompson et al. |
| 2013/0191202 A1 | 7/2013 | Postrel |
| 2013/0204681 A1 | 8/2013 | Kraft et al. |
| 2013/0204686 A1 | 8/2013 | Roberts et al. |
| 2013/0204688 A1 | 8/2013 | Yahn |
| 2013/0204781 A1 | 8/2013 | Flitcroft et al. |
| 2013/0246209 A1 | 9/2013 | White |
| 2013/0254074 A1 | 9/2013 | Joa et al. |
| 2013/0254086 A1 | 9/2013 | Joa et al. |
| 2013/0254106 A1 | 9/2013 | Webber et al. |
| 2013/0268413 A1 | 10/2013 | Burr et al. |
| 2013/0275246 A1 | 10/2013 | Ramaratnam et al. |
| 2013/0297473 A1 | 11/2013 | Wolfe |
| 2013/0304559 A1 | 11/2013 | Stone et al. |
| 2013/0304620 A1 | 11/2013 | Bhattacharya et al. |
| 2014/0006268 A1 | 1/2014 | Roberts et al. |
| 2014/0012647 A1 | 1/2014 | Hecht |
| 2014/0046784 A1 | 2/2014 | Prakash et al. |
| 2014/0052525 A1 | 2/2014 | Postrel |
| 2014/0058868 A1 | 2/2014 | Sharma et al. |
| 2014/0081736 A1 | 3/2014 | Blackhurst et al. |
| 2014/0095218 A1 | 4/2014 | Golembeski |
| 2014/0100939 A1 | 4/2014 | Postrel |
| 2014/0108196 A1 | 4/2014 | Yankovich et al. |
| 2014/0122324 A1 | 5/2014 | Spier |
| 2014/0122327 A1 | 5/2014 | Aleles et al. |
| 2014/0122331 A1 | 5/2014 | Vaish et al. |
| 2014/0136351 A1 | 5/2014 | Lennon |
| 2014/0143089 A1 | 5/2014 | Campos et al. |
| 2014/0156511 A1 | 6/2014 | Ren |
| 2014/0201012 A1 | 7/2014 | Doran et al. |
| 2014/0236841 A1 | 8/2014 | Tan et al. |
| 2014/0289111 A1 | 9/2014 | Doran et al. |
| 2015/0025987 A1 | 1/2015 | Yahn |
| 2015/0170124 A1 | 6/2015 | Sorenson et al. |
| 2015/0278801 A1 | 10/2015 | Friedlander et al. |

FOREIGN PATENT DOCUMENTS

| | | |
|---|---|---|
| CA | 2067987 A1 | 11/1992 |
| CA | 2421308 A1 | 3/2002 |
| CH | 680171 A5 | 6/1992 |
| DE | 660354 C | 5/1938 |
| DE | 2528735 A1 | 4/1976 |
| DE | 3021327 A1 | 12/1981 |
| DE | 3147603 A1 | 6/1983 |
| EP | 0313294 A2 | 4/1989 |
| EP | 0351217 A2 | 1/1990 |
| EP | 0420163 A1 | 4/1991 |
| EP | 0458610 A1 | 11/1991 |
| EP | 0477722 A2 | 4/1992 |
| EP | 0857579 A2 | 8/1998 |
| EP | 0924662 A2 | 6/1999 |
| EP | 0924664 A2 | 6/1999 |
| EP | 0924665 A2 | 6/1999 |
| EP | 1178448 A2 | 2/2002 |
| EP | 2367150 A1 | 9/2011 |
| FR | 2042254 A5 | 2/1971 |
| FR | 2342531 A1 | 9/1977 |
| GB | 958741 A | 5/1964 |
| GB | 1564723 A | 4/1980 |
| GB | 2095452 A | 9/1982 |
| GB | 2121582 A | 12/1983 |
| GB | 2153128 A | 8/1985 |
| GB | 2175427 A | 11/1986 |
| GB | 2186411 A | 8/1987 |
| GB | 2188467 A | 9/1987 |
| GB | 2198274 A | 6/1988 |
| GB | 2223340 A | 4/1990 |
| GB | 2223872 A | 4/1990 |
| GB | 2255666 A | 11/1992 |
| IE | 80670 B2 | 11/1998 |

(56) References Cited

FOREIGN PATENT DOCUMENTS

| | | |
|---|---|---|
| JP | 392994 | 10/1989 |
| JP | 281193 | 3/1990 |
| JP | 363795 A | 3/1991 |
| JP | 392994 | 4/1991 |
| JP | 1307891 A | 11/1999 |
| JP | 3252795 B2 | 2/2002 |
| JP | 2006301807 A | 11/2006 |
| JP | 2007241925 A | 9/2007 |
| JP | 2007257578 A | 10/2007 |
| JP | 4315288 B2 | 8/2009 |
| JP | 4344995 B2 | 10/2009 |
| JP | 5249892 B2 | 7/2013 |
| JP | 5250296 B2 | 7/2013 |
| SE | 44244 C1 | 9/1918 |
| SE | 44247 C1 | 9/1918 |
| SE | 50250 C1 | 11/1919 |
| SE | 8801851 A | 11/1989 |
| WO | 9406101 A1 | 3/1994 |
| WO | 9409440 A1 | 4/1994 |
| WO | 9530215 A1 | 11/1995 |
| WO | 9626508 A1 | 8/1996 |
| WO | 9630877 A1 | 10/1996 |
| WO | 9825241 A2 | 6/1998 |
| WO | 9836521 A1 | 8/1998 |
| WO | 9900772 A1 | 1/1999 |
| WO | 9928830 A1 | 6/1999 |
| WO | 9950785 A1 | 10/1999 |
| WO | 0010138 A1 | 2/2000 |
| WO | 0011568 A1 | 3/2000 |
| WO | 0025507 A1 | 5/2000 |
| WO | 0075889 A2 | 12/2000 |
| WO | 0139093 A1 | 5/2001 |
| WO | 01037172 A1 | 5/2001 |
| WO | 0142945 A1 | 6/2001 |
| WO | 0159722 A2 | 8/2001 |
| WO | 0191035 A1 | 11/2001 |
| WO | 0207071 A1 | 1/2002 |
| WO | 0209001 A1 | 1/2002 |
| WO | 02075680 A1 | 9/2002 |
| WO | 03046845 A2 | 6/2003 |
| WO | 03071386 A2 | 8/2003 |
| WO | 03071387 A2 | 8/2003 |
| WO | 03071495 A1 | 8/2003 |
| WO | 2008027324 A2 | 3/2008 |
| WO | 2010091329 | 8/2010 |

OTHER PUBLICATIONS

No Author, "ATM Outsourcing: Turning Costs into Profits", © 2009 First Data Corporation (Year: 2009).*
Jim Bowen "How ATM's Work" Apr. 1, 2000 HowStuffWorks.com <https://money.howstuffworks.com/personal-finance/banking/atm.htm> (Year: 2000).*
U.S. Appl. No. 14/617,672, filed Feb. 9, 2015, Lindemulder, Elizabeth L., et al.
U.S. Appl. No. 14/794,603, filed Jul. 8, 2015, Lennon, Kevin V., et al.
Canada Examiner's Report for Canadian Application No. 2815428, dated Feb. 1, 2016, 4 pages.
Extended European Search Report for European Patent Application No. 11838698.6, dated Apr. 11, 2016, 8 pages.
"ACI Gift Cards, Inc. Launches Amazon Gift Codes on Demand," Sep. 5, 2008, available at http://www.reuters.com/article/2008/09/05/idus11420+05-sep-2008+bw2008905.
"Cash in your jar of change without paying fees to do it," Nov. 21, 2009, available at http://www.examiner.com/article/cash-your-jar-of-change-without-paying-fees-to-do-it.
1-800 Gift Certificate, http://www.800giftcertificate.com, accessed Feb. 16, 1999, 12 pages.
Australian Examination Report in Patent Application No. 2011323490, dated Sep. 2, 2014, 3 pages.
Bedienungsanleitung CDS 500/MCC 500, 1991, 9 pages.
Canada Examiner's Report for Canadian Application No. 2815428, dated Jan. 26, 2015, 4 pages.
Cash, M., "Bank blends new technology with service", *Winnepeg Free Press,* Sep. 4, 1992, 1 page.
F. Zimmerman & Co., "Reference Manual Contovit/Sortovit, Perconta Money Counting and Sorting Systems", Aug. 1995, pp. I-III, 1-31, and three pages of specifications.
First USA: First USA Introduces the Gift Card: Pre-Paid Visa Card Works Better than a Gift Certificate, Business Editors, Nov. 12, 1998, 3 pages.
Fri Kopenskap articles, Mar. 18, 1988, Apr. 27, 1989 and Nov. 25, 1988, 6 pages.
Geldinstitute Literature, Mar. 1990 and Apr.-May 1992, 2 pages.
Gift Certificate Express, http://www.giftcertificateexpress.com, accessed Feb. 16, 1999, 10 pages.
Hamilton, "Turning Cans into Cold Cash", *The Washington Post,* Jul. 2, 1991, pp. D1, D4, pp. 194-209.
Leitch, C., "High-tech bank counts coins," *Innovations,* Report on Business, Sep. 18, 1991, 1 page.
Llemeon, J., "Royal's Burlington drive-in bank provides customers 24-hour tellers," *Business Today, The Toronto Star,* Aug. 21, 1991, 1 page.
NCR, "NCR 7401 Retail Self-Service Solution," 1999, 2 pages.
NCR, "NCR 7800 Consumer Price Verifier," http://www3.ncr.com/product/retail/product/catalog/7800.shtml, accessed Mar. 18, 1999, pp. 1-2.
Oxby, M., "Royal Bank opens 'super branch'", *The Gazette Montreal,* Sep. 14, 1991, 1 page.
Reis Eurosystems Geldbearbeitungssysteme, "Test-Programme CS 3110 Selectronic coin sorting and counting machine," Jul. 1992, pp. 1-3.
Reis Eurosystems, "Operating Instructions CS 3110 Selectronic Coin Sorting and Counting Machine With Central Sensor", Jul. 1992, pp. 1-12, I-IV.
Slide Changing Apparatus With Slide Jam Protection, Research Disclosure 30509, Sep. 1989, 3 pages.
Spectrum One, "Spectrum One? Network Solutions for Wireless Data Capture," <http://www.symbol.com/ST0000129.HTM>, accessed Mar. 18, 1999, pp. 1-5.
Super Branch Literature, Feb. 1992, 2 pages.
SymbolSolutions, "Supermarket Buys Two Solutions for the Price of One," http://www.symbol.com/solution/017SS.HTM, accessed Mar. 18, 1999, pp. 1-3.
Translated Article from Praktiskt Butiksarbete, Sep. 1992, 2 pages.
Quora, "Why don't retailers buy back their own gift cards at a discount?" 2013. Retrieved from the internet on Aug. 19, 2016 at <https://www.quora.com/Why-don't-retailers-buy-back-their-own-gift-cards-at-a-discount>.
Examination Report issued in Australian Application No. 2018206735, dated May 5, 2019, 5 pages.

* cited by examiner

GIFT CARD EXCHANGE KIOSKS AND ASSOCIATED METHODS OF USE

CROSS-REFERENCE TO RELATED APPLICATION(S)

This application is a continuation of U.S. patent application Ser. No. 13/286,971, filed Nov. 1, 2011, entitled "GIFT CARD EXCHANGE KIOSKS AND ASSOCIATED METHODS OF USE," which claims the benefit of U.S. Provisional Application No. 61/409,050, filed Nov. 1, 2010, entitled "GIFT CARD EXCHANGE KIOSKS AND ASSOCIATED METHODS OF USE," each of which is incorporated herein by reference in its entirety.

CROSS-REFERENCE TO APPLICATION(S) INCORPORATED BY REFERENCE

The disclosures of U.S. Pat. No. 8,024,272, entitled "METHODS AND SYSTEMS FOR EXCHANGING/TRANSFERRING GIFT CARDS," filed Apr. 12, 2010; U.S. Pat. No. 7,653,599, entitled "METHODS AND SYSTEMS FOR EXCHANGING AND/OR TRANSFERRING VARIOUS FORMS OF VALUE," filed Apr. 13, 2005; U.S. patent application Ser. No. 11/294,637, entitled "METHODS AND SYSTEMS FOR EXCHANGING AND/OR TRANSFERRING VARIOUS FORMS OF VALUE," filed Dec. 5, 2005; U.S. patent application Ser. No. 12/177,275, entitled "METHODS AND SYSTEMS FOR EXCHANGING AND/OR TRANSFERRING VARIOUS FORMS OF VALUE," filed Jul. 22, 2008; and U.S. patent application Ser. No. 10/558,907, entitled "METHODS AND SYSTEMS FOR PROVIDING PRODUCTS, SUCH AS DIGITAL CONTENT INCLUDING GAMES, RING TONES, AND/OR GRAPHICS; AND SERVICES, SUCH AS COMPUTER NETWORK SERVICE INCLUDING INTERNET SERVICE," filed Feb. 7, 2007; are incorporated herein by reference in their entireties.

TECHNICAL FIELD

The present disclosure relates generally to systems, apparatuses and methods for exchanging gift cards and, more particularly, to consumer operated kiosks for exchanging gift cards.

BACKGROUND

Gift cards are restricted monetary equivalents issued by retailers or banks that consumers can use as an alternative to currency for purchasing goods, services, etc. While gift cards rank as one of the most popular gifts given by consumers in the United States, a large percentage of gift cards go unused or expire each year, resulting in significant annual breakage (i.e., unused gift card value).

Various methods have been proposed to reduce breakage. Some web sites, for example, provide consumers with the ability to auction unwanted gift cards. Other websites provide consumers with the ability to exchange unwanted gift cards for cash through the mail. The current options for exchanging gift cards, however, can appear complex and/or time consuming to consumers. Additionally, gift cards that have been taken in an exchange may be difficult to resell, leading to further breakage. Accordingly, it would be advantageous to provide consumers with a relatively easy way to exchange unwanted gift cards for other forms of value and avoid breakage.

DETAILED DESCRIPTION

The present disclosure describes various embodiments of systems and methods for exchanging various types of gift cards, virtual gift cards, gift card facsimiles, and similar financial instruments (e.g., pre-paid cards, etc.). Exchanging gift cards allows consumers to monetorize their unused or unwanted gift cards. A consumer operated kiosk configured in accordance with several embodiments of the disclosure can receive a gift card, verify the gift card's activation status and value, and provide exchange options to a consumer. The options can include, for example, (1) exchanging the gift card for cash, and/or (2) exchanging the gift card for another gift card. After receiving a gift card from a consumer and dispensing the desired output in exchange, the kiosk can retain the gift card in the kiosk, update a gift card database to reflect the exchange, and/or resell the gift card value to another consumer. In various embodiments described herein, the term "gift card" can generally refer to a card that resembles a credit card, but has a predetermined monetary equivalent (i.e., a face value). A gift card typically includes a gift card identifier (e.g., a number, etc.) that is cross-linked to the gift card's face value. Gift cards can include barcodes, magnetic stripes, processors (e.g., smart chips), and/or other media for recording gift card identifiers, codes, values, and/or other suitable information. As used herein, the term "gift card" can also encompass virtual gift cards that can be delivered via email, text messages or mobile phone applications (e.g., iPhone applications) and displayed using a smart phone, tablet, and/or other suitable devices. Gift cards may be open loop or closed loop cards. Banks or credit card companies can issue open loop cards that can be redeemed at different commercial establishments. Conversely, restaurants, stores, and other retail establishments generally issue closed loop cards that are only valid for use at the retail establishment or its retail partners.

Certain details are set forth in the following description and in FIGS. 1-4 to provide a thorough understanding of various embodiments of the disclosure. Other well-known structures and systems often associated with gift cards, gift card payment systems, consumer operated kiosks, and related commerce systems have not been shown or described in detail below to avoid unnecessarily obscuring the descriptions of the various embodiments of the disclosure. Additionally, a person of ordinary skill in the relevant art will understand that the disclosure may have additional embodiments that may be practiced without several of the details described below. In other instances, those of ordinary skill in the relevant art will appreciate that the methods and systems described can include additional details without departing from the spirit or scope of the disclosed embodiments.

Many of the details, dimensions, functions and other features shown and described in conjunction with the Figures are merely illustrative of particular embodiments of the disclosure. Accordingly, other embodiments can have other details, dimensions, functions and features without departing from the spirit or scope of the present disclosure. In addition, those of ordinary skill in the art will appreciate that further embodiments of the disclosure can be practiced without several of the details described below.

Figure 1:
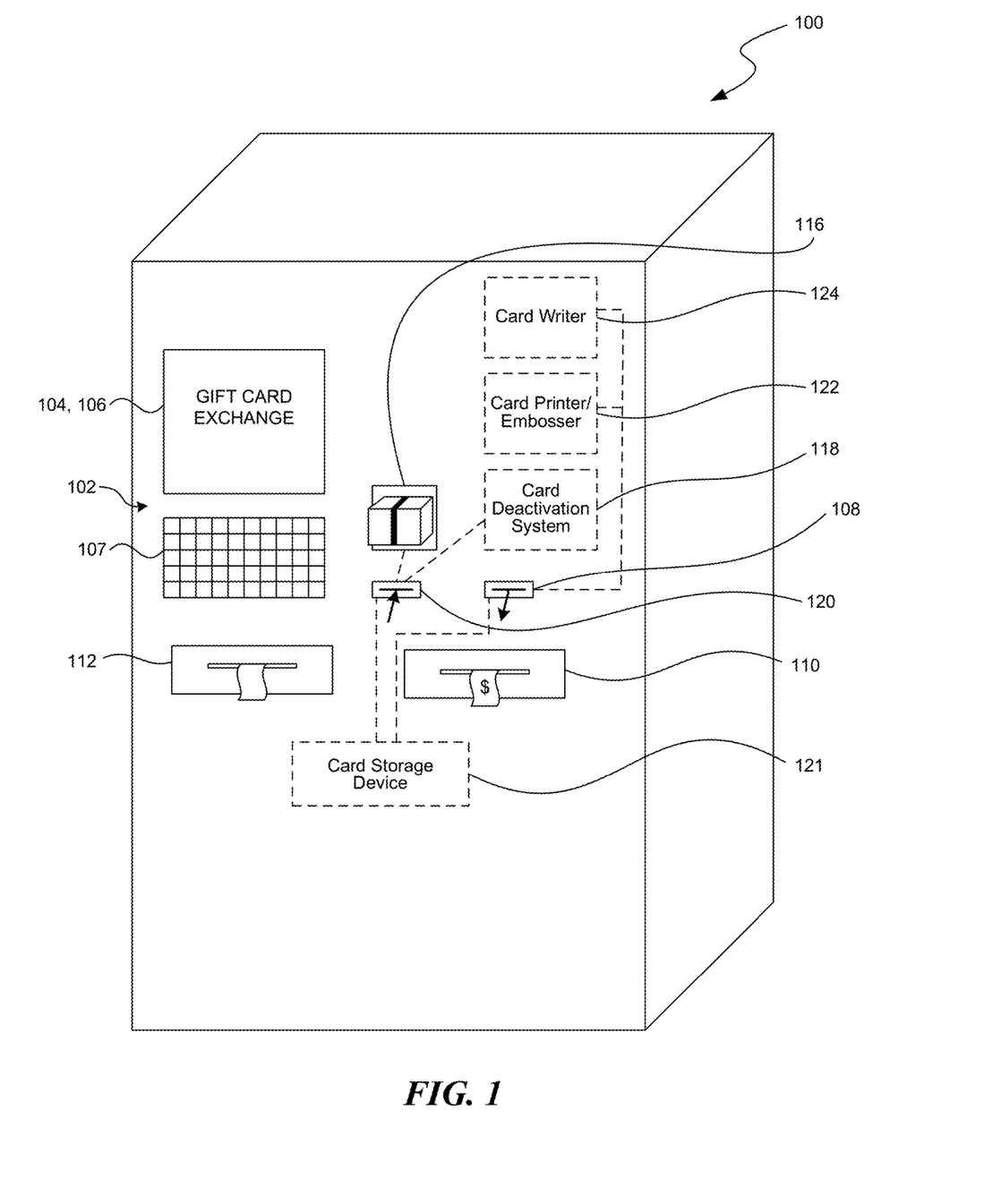
FIG. 1 is a partially schematic isometric view illustrating various components and subsystems associated with a gift card exchange kiosk configured in accordance with an embodiment of the disclosure.

FIG. 1 is a partially schematic isometric view of a gift card exchange kiosk 100 ("kiosk 100") configured in accordance with an embodiment of the disclosure. The kiosk 100 can include a user interface 102 and one or more output devices. The user interface 102 can include a display screen 104 and one or more input devices, such as a card input slot 120. Additionally, the input device can include a keyboard 107, a bar code reader, an encrypted PIN pad, a voice command device, a curser control device, a mouse, and/or other suitable input devices that enable or facilitate entering information. In the illustrated embodiment, the user interface 102 includes a touch screen 106 that is configured to both display information and receive user inputs.

In some embodiments, the kiosk 100 can hold a supply of blank gift cards to accommodate new card sales. The blank gift cards can include magnetic stripes that can have various types of information (e.g., card identifiers, account information, store numbers, etc.) written to them with a card writer 124 when the gift card is purchased. In other embodiments, the magnetic stripes can include pre-encoded identification codes that the kiosk 100 can read from the gift cards and associate with a remote account and a corresponding value before the gift cards are dispensed from the kiosk 100. The kiosk 100 can also include, a card printer 122 (e.g., a two-sided printer) configured to print information and graphics (e.g., the name of a retail establishment, customized text, access numbers, legal information, bar codes, etc.) on gift cards and/or an embosser that can emboss information (e.g. account numbers, etc.) on new gift cards. Once the appropriate information has been added to the new gift card, it can be dispensed from the kiosk 100 via a card dispenser 108. As shown in the illustrated embodiment, the kiosk 100 can include other output devices, such as a currency dispenser 110 and a voucher and/or receipt dispenser 112 connected to a printer 114 (e.g., a thermal printer) configured to print redeemable cash vouchers and/or receipts during and/or after transactions. The voucher dispenser 112 can also be configured to dispense vouchers with card identifiers (e.g., bar codes, card numbers, etc.) and/or card values printed thereon (e.g., rather than dispensing new gift cards). In other embodiments, the kiosk 100 can include other suitable output devices that enable or facilitate dispensing items related to exchanging gift cards.

The kiosk 100 can further include a card reader 116 (e.g., a card swipe) for reading magnetic stripes, microchips, optical media, and/or other types of storage media on gift cards, credit cards, debit cards, and/or other types of financial instruments submitted by consumers. In some embodiments, the card reader 116 and card input slot 120 can be incorporated into a singular device. In other embodiments, the card reader 116 can be operatively coupled to the card input slot 120.

The display screen 104 can include one or more devices that display options related to exchanging gift cards and/or reselling previously exchanged gift cards. For example, the display screen 104 can include a screen, a monitor, a touch screen, a digital read out, and other suitable devices. The options can include, for example, (1) exchanging one or more gift cards for cash or a redeemable cash voucher, (2) exchanging a first gift card for a second gift card, (3) rejecting an exchange, (4) buying a gift card, (5) a combination of the above listed options, and/or other suitable options.

In various embodiments, the display screen 104 can display information and/or images related to various gift cards for sale in a virtual gift card inventory ("inventory"). The inventory can be stored in a remote database connected to the kiosk 100 via a communications link (described in detail in FIG. 2). In an alternative embodiment, the inventory can be stored locally on a hard drive or another storage device within the kiosk 100. The inventory can include gift card information related to gift cards previously exchanged with the kiosk 100, with another kiosk connected in a kiosk network, and/or data from other gift cards. For example, the inventory can include gift card identifiers (e.g., card numbers) cross-linked with face values, store names, card activation statuses, etc. Consumers can browse the inventory with the user interface 102 using parameters such as store name, price, face value, discount, and/or other suitable browsing parameters. In other embodiments, the information and/or images related to various gift cards for sale in the inventory can be displayed on a remote device (e.g., a remote personal computer, mobile phone, PDA, tablet, etc.) connected to the database.

In one embodiment, the gift card identifier (e.g., a gift card number) and the face value of individual gift cards in the inventory can be stored in the database, and new gift cards can be sold having the same gift card identifier and face value. For example, a first consumer can use the kiosk 100 to exchange a first gift card having a face value of $100 from a first retail establishment, and a second consumer can use the kiosk 100 (or another kiosk connected to the kiosk 100) to exchange a second gift card having a face value of $50 from the first retail establishment. The inventory can be updated after each transaction and, thus, would include a first gift card identifier cross-linked with a $100 face value and a second gift card identifier cross-linked with a $50 face value. In this example, a third consumer could then use the kiosk 100 (or another kiosk connected to the kiosk 100) to buy a new gift card from the first retail establishment for a face value of either $100 or $50. For example, if the third consumer selects a new gift card with a face value of $100, the kiosk 100 can pull a blank card from storage and add the first gift card identifier to the new card before dispensing it to the third consumer via the card outlet 108.

The first gift card identifier can be added to the new card in a number of different ways. For example, in one embodiment the card writer 124 can write the first gift card identifier to a magnetic stripe on the new card. In other embodiments, the card printer 122 can print the first gift card identifier on the new card in bar code. The card printer 122 can also print other information and graphics (e.g., store logo, seasonal designs, etc.) on the card, and/or an embosser can emboss information (e.g., card numbers, expiration date, etc.) on the card. In further embodiments, the kiosk 100 can store blank cards having smart chips, and the kiosk 100 can be configured to program the smart chip with the value associated with the first gift card identifier (e.g., $100).

In other embodiments, the kiosk 100 can store exchanged gift cards locally in a storage device 121 (e.g., a card holder) and resell the locally stored gift cards. For example, a first consumer can use the kiosk 100 to exchange a first gift card having a face value of $100, and the kiosk 100 can store the first gift card locally in the storage device 121. A second consumer can use the kiosk 100 to buy the first gift card, and the kiosk 100 can retrieve the first gift card from the storage device 121 and dispense the first gift card from the card dispenser 108. In further embodiments, the previously exchanged gift cards in the storage device 121 can be removed from the kiosk 100 and resold at a remote location, such as on a website for buying gift cards.

In another embodiment, the value of previously exchanged gift cards can be accumulated in the inventory, and consumers can set a face value of their choosing for a desired gift card using the user interface 102. For example, a first consumer can use the kiosk 100 to exchange a first gift card having a face value of $100 from a first retail establishment, and a second consumer can use the kiosk 100 (or another kiosk connected to the kiosk 100) to exchange a second gift card having a face value of $50 from the first retail establishment. After each transaction, the inventory is updated and, thus, would include at least $150 worth of gift card value from the first retail establishment. A third consumer wishing to buy a gift card for use at the first retail establishment can then use the kiosk 100 (or another kiosk connected to the kiosk 100) to buy a third gift card for any face value up to $150 (e.g., $75). The kiosk 100 can write a new gift card identifier to a magnetic stripe on a blank card with the card writer 124, and associate the new gift card identifier with a $75 face value. Alternatively, the kiosk 100 can print a bar code associated with the new gift card identifier on a blank card using the card printer 122. In additional embodiments, the inventory can accumulate the face value of previously exchanged gift cards from a first retail establishment, and store the face value of individual gift cards from a second retail establishment. In still further embodiments, the inventory can be accessed via the Internet where consumers can order gift cards for various predetermined face values or select there own gift card values up to a predetermined limit (e.g., set by the total value of previously exchanged gift cards from a specific retailer).

In further aspects of the illustrated embodiment, the kiosk 100 can include a card deactivation system 118 operatively coupled to the card input slot 120 to prevent gift cards exchanged by the kiosk 100 from improperly or fraudulently reentering the stream of commerce. The card deactivation system 118 can include one or more devices that physically deactivate gift cards (e.g., a card demagnetizer, shredder, etc.), and/or change the status of gift cards from "active" to "void" or "deactivated" in a database (described below in FIG. 2) via the communications link. For example, before dispensing an output (e.g., a redeemable cash voucher, a new gift card), the kiosk 100 can direct a consumer to insert his or her gift card into the card input slot 120, and the card deactivation system 118 can deactivate (e.g., change status, demagnetize, shred) the gift card.

The kiosk 100 can also include devices that customize gift cards per user specifications. For example, the user interface 102 can be configured to receive consumer input defining text, fonts, pictures, colors, and/or other desired features that can be printed onto a gift card using the card printer 122 and dispensed from the card dispenser 108.

In operation, the kiosk 100 can exchange one or more gift cards tendered by a consumer for a selected output, such as cash, a redeemable cash voucher, other gift cards (e.g., new gift cards or previously exchanged gift cards), or a combination of outputs. The kiosk 100 can receive information about the first gift card (e.g., gift card identifier) via the user interface 102 and/or the card reader 116, and can respond by displaying options to the consumer on the display screen 104. The consumer can select an option via the user interface 102. Depending on the option selected, the kiosk 100 can dispense an output to the consumer via the appropriate output device (e.g., the card dispenser 108, the currency dispenser 110, or the voucher dispenser 112). Additionally, the kiosk 100 can receive consumer identification information, such as a consumer's name, credit card number, etc. from the user interface 102, and/or the card reader 116.

In one embodiment, the kiosk 100 can be used by a card-holder to exchange a gift card for cash or a redeemable cash voucher (i.e., a buy-back value). The buy-back value is the value the kiosk 100 will pay in exchange for a gift card. The buy-back value can be a fixed rate (e.g., 75% of face value) and/or can vary according to an algorithm associated with one or more factors. Factors can include, for example, anticipated demand for a particular type of gift card from a certain retail establishment, the face value of the gift card, the expiration date, the projected resale value, and/or other suitable factors.

In another embodiment, the buy-back value can vary depending on the type of output the consumer selects. For example, a first gift card can have a first buy-back value associated with a first option (e.g., a redeemable cash voucher), and a second buy-back-value associated with a second option (e.g., a second gift card).

In further embodiments, the kiosk 100, can also sell gift cards based on the gift card values stored in the virtual gift card inventory. Consumers can browse the gift cards for sale in the inventory using the user interface 102 by viewing gift card information and/or images on the display device 104 and searching the inventory with the user input device 106. When the consumer finds a gift card he or she wishes to purchase, the consumer can select the card via the user interface 102, and the kiosk 100 can write the gift card identifier and/or other information to a magnetic stripe on the card, or print this information in a bar code on the card. The kiosk can also print other information (e.g., the card value, store name, store logo, etc.) on the selected gift card using the card printer 122 and then dispense the selected gift card via the card dispenser 108. In other embodiments, the virtual gift card inventory can be viewed remotely on a website (e.g., via a home computer, tablet, or mobile phone), and gift cards in the inventory can be purchased via the Internet. The remotely purchased gift cards can be physical gift cards or vouchers sent to purchasers by mail or they can come in the form of virtual gift cards send via email.

In one embodiment, the kiosk 100 can resell a gift card for a resale value that is less than the face value of the gift card. For example, a gift card with a face value of $100 can be resold from the kiosk 100 for $85. The resale value can be determined by various factors, such as anticipated demand for a particular type of gift card from a certain retail establishment, the face value of the gift card, the expiration date, the projected resale value, and/or other suitable factors. Additionally, in one embodiment, the buy-back value and the resale value can be correlated so that the buy-back value is less than the resale value. For example, a gift card having a face value of $100 can have a buy-back value of $70 and a resale value of $75. This arbitrage feature can simultaneously accommodate consumers who prefer to monetorize their unwanted gift cards and consumers who want to buy gift cards at a discount.

Figure 2:
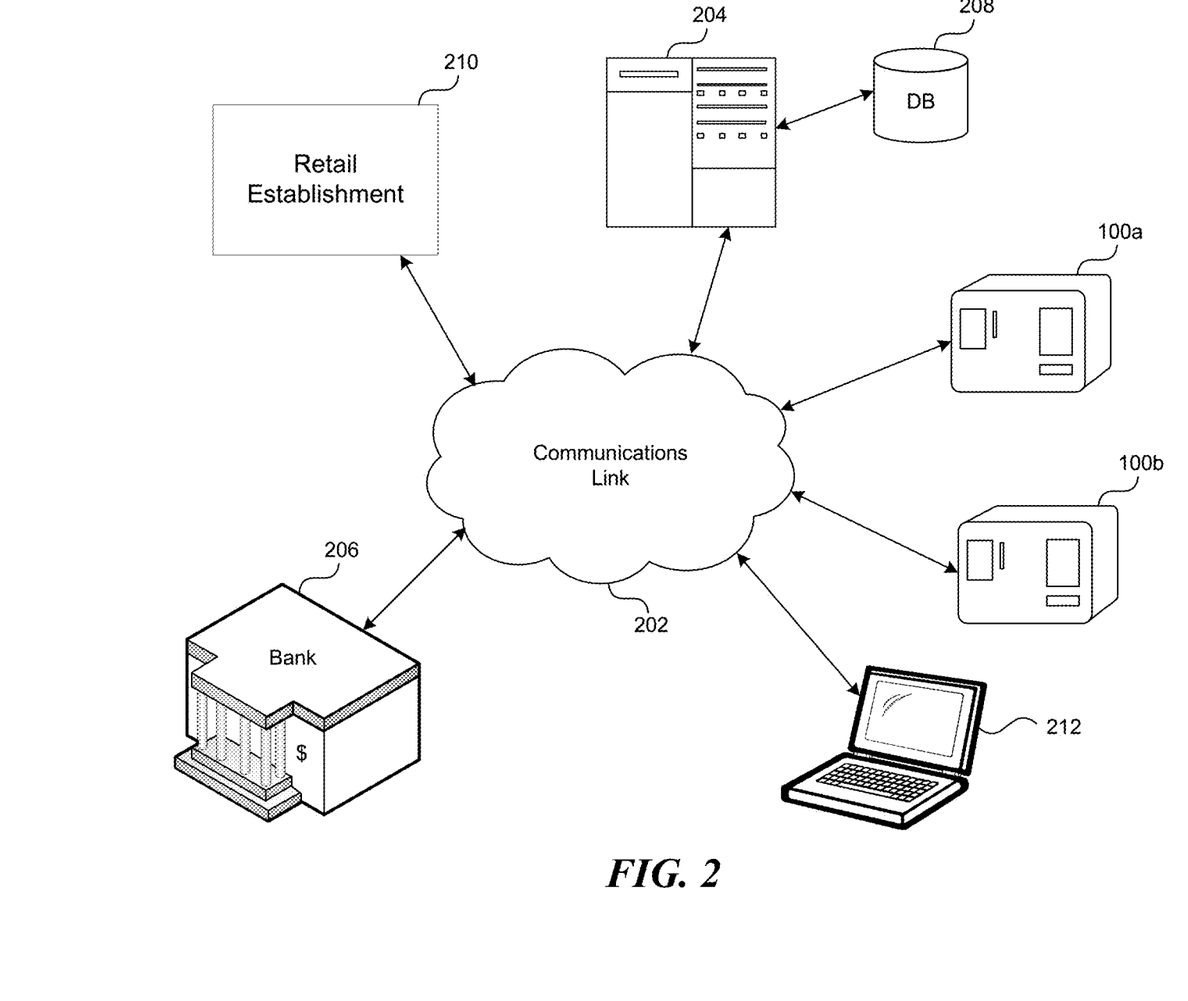
FIG. 2 illustrates a suitable network environment for implementing various aspects of exchanging gift cards configured in accordance with embodiments of the disclosure.

FIG. 2 illustrates a suitable system or network environment for implementing various aspects of the gift card exchange system described in detail above. In the illustrated embodiment, a plurality of the kiosks 100 (identified individually as a first kiosk 100a and a second kiosk 100b) can be operatively connected to a server 204 via the Internet, a dedicated network, and/or other communications link 202. The server 204 performs much or all of the functions for receiving, routing, and storing of application programs, electronic messages, and other information associated with features of the kiosk network. The server 204 can include a server engine, a content management component, and a database management component. The server engine performs basic processing and operating system level tasks. The content management component handles many of the functions (e.g., determining gift card sale value and managing inventory) in the embodiments described herein. Other functions can be handled by the kiosk 100. The database management component includes storage and retrieval tasks with respect to a database 208 coupled to the server 204, queries to the database 208, and storage of data. The database 208 can store at least some of the content exchanged between the kiosks 100, information (e.g., gift card identifiers, card activation statuses, face values, etc.) associated with gift cards, and can store the virtual gift card inventory described above. As will be apparent to those skilled in the art, the server 204 can include a single server or a plurality of servers, and the database 208 can include a single database or a plurality of databases.

Additionally, the server 204, including the database 208, may employ security measures to inhibit malicious attacks on the system and to preserve integrity of the messages and data stored therein (e.g., firewall systems, secure socket layers (SSL) password protection schemes, encryption, and the like).

In the illustrated embodiment, the communications link 202 can further be connected to financial institutions 206 (e.g., a bank, automated clearing house (ACH), etc.) and retail establishments 210. The financial institution 206 can perform credit and/or debit card transactions, provide payment options and/or to identify consumers. The retail establishment 210 can provide information regarding gift card balances, gift card usage, etc.

The system illustrated in FIG. 2 can connect individual kiosks 100a, 100b to the server 204 to share information. For example, the card reader 116 on the kiosk 100a can read a first gift card identifier from a first gift card or the user interface 102 can receive a first gift card identifier associated with the first gift card. Through the communications link 202, the server 204 can query the database 208 regarding the first gift card's activation status and face value. The server 204 can communicate this information to the kiosk 100a via the communications link 202. In other embodiments, the retail establishment 210 can provide the first gift card's activation status and face value to the kiosk 100a via the communications link 202. If the first gift card is inactive or fraudulent, the kiosk 100a can reject the first gift card (e.g., dispense the first gift card, deactivate the first gift card, etc.). If the first gift card is active, the kiosk 100a and/or the server 204 can provide a buy-back value associated with the first gift card. The kiosk 100a, then, displays options to the consumer on the display screen 104, and receives a selection from the consumer via the user interface 102. If the selection corresponds to accepting the buy-back value, the kiosk 100a dispenses the buy-back value, and the data from the first gift card (e.g., gift card identifier, face value, etc.) can be added to the virtual gift card inventory stored in the database 208. The server 204 can also deactivate the first gift card (via the card deactivation system 118) in the database 208 and/or notify the database 208 that the kiosk 100a has possession of the first gift card. The kiosk 100a or another kiosk 100b connected to the communications link 202 can resell the face value on the first gift card by printing and/or writing the first gift card identifier on a new gift card and dispensing the new gift card. The communications link 202 can also connect the kiosks 100 to a remote personal device 212 (e.g., a computer, tablet, mobile phone, etc.) where consumers can browse the virtual gift cards inventory stored on the database 208 (e.g., via a website, a smart phone or tablet application, etc.) and purchase gift cards therefrom.

Using the network environment in FIG. 2, multiple kiosks 100 can be connected to one another via the communications link 202 and positioned in a plurality of publicly accessible areas, such as grocery stores or home improvement stores. This allows a first consumer at the first kiosk 100a in a first location to browse gift cards in the virtual gift card inventory and find a gift card previously exchanged by the second kiosk 100b in a second location.

Figure 3A:
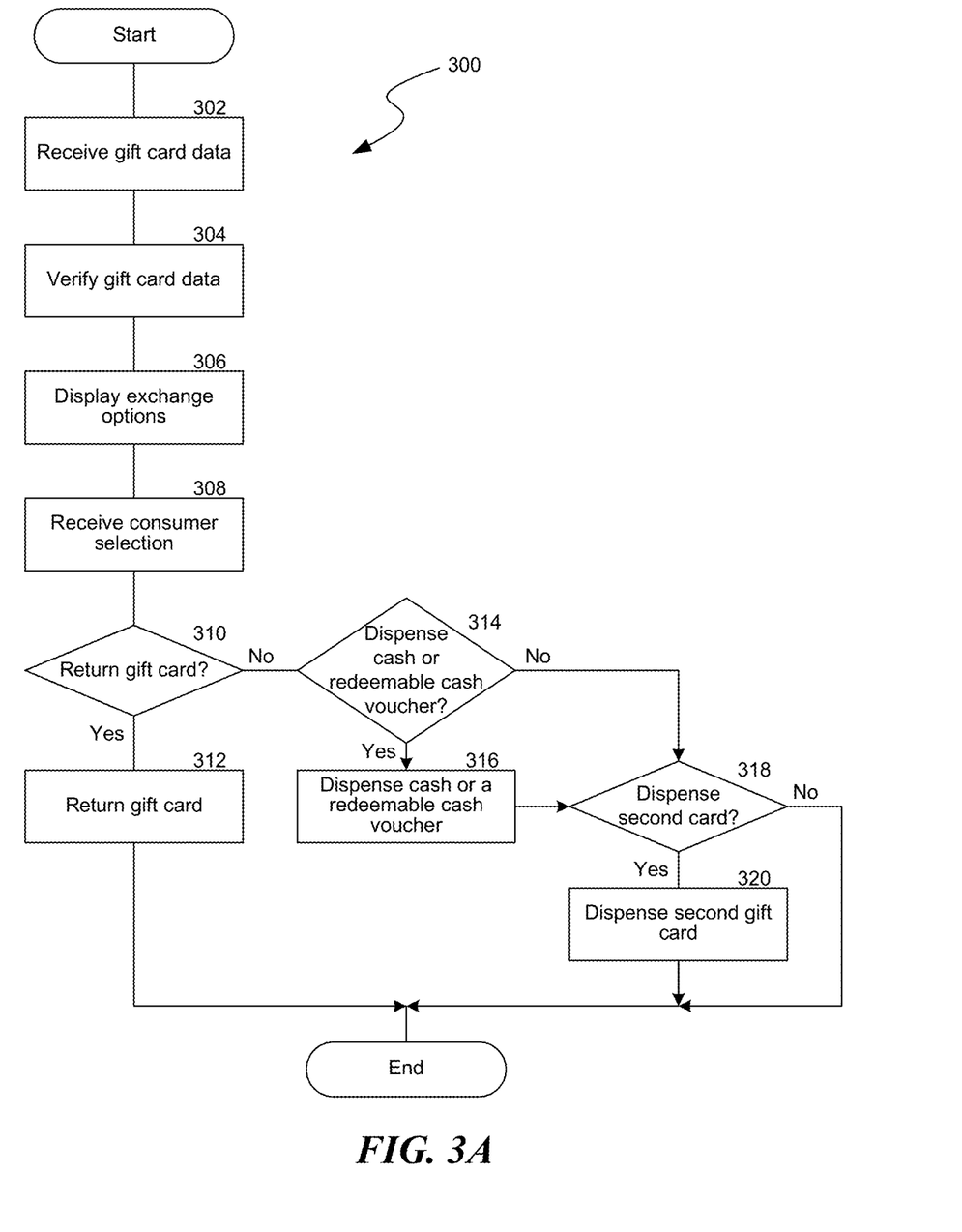
FIG. 3A is a flow diagram of a routine for exchanging gift cards with a consumer operated kiosk configured in accordance with an embodiment of the disclosure.
Figure 3B:
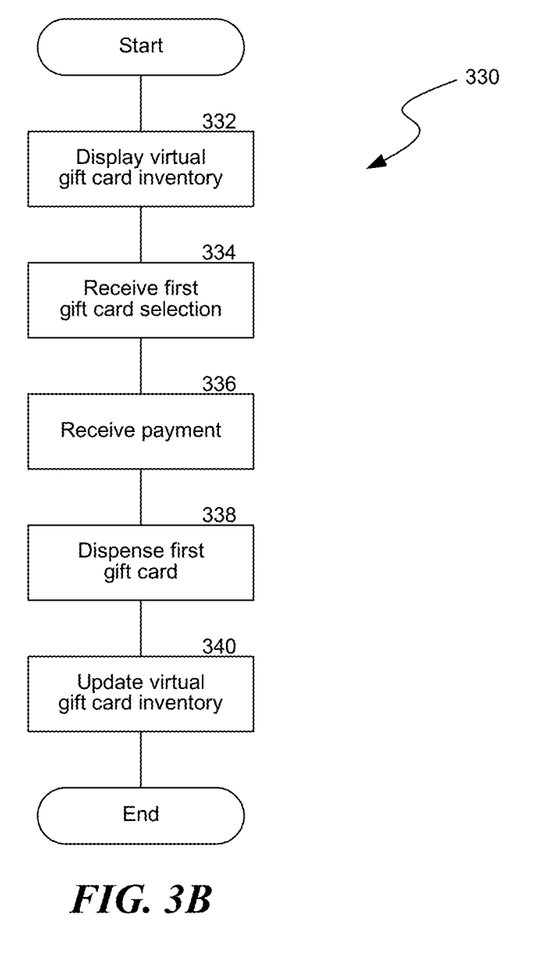
FIG. 3B is a flow diagram of a routine for buying gift cards with a consumer operated kiosk configured in accordance with another embodiment of the disclosure.

FIG. 3A is a flow diagram of a routine 300 for exchanging a gift card with a kiosk (e.g., the kiosk 100), and FIG. 3B is a flow diagram of a routine 330 for buying a gift card with a kiosk. Referring to FIG. 3A, a person wishing to exchange a first gift card provides the gift card to the kiosk, e.g., by swiping the first gift card through a card swipe or inserting the first gift card into a card input slot. In block 302, the kiosk receives first gift card data (e.g., first gift card identifier). This step can include reading a magnetic stripe on the first gift card using the card reader, reading a bar code (with, e.g., a bar code scanner), reading a smart chip, and/or receiving data from a user interface (e.g., entering a gift card identifier, selecting a retail establishment). The kiosk can also request that the consumer input a gift card PIN using a touch screen, pin pad, and/or other suitable input device to further validate the first gift card and deter fraud. In block 304, the kiosk verifies the first gift card data by connecting to a server and database, or connecting to the card merchant system (e.g., a retail establishment), to determine the face value of the first gift card, its card activation status, and/or other relevant information.

In block 306, the kiosk can display options to the consumer for exchanging the first gift card. The options can include, for example, (1) returning the gift card, (2) exchanging the gift card for cash or a redeemable cash voucher, (3) exchanging the gift card for a second gift card, (4) buying a new gift card, (5) a combination of the above listed options, and/or other options. In block 308, the kiosk receives a consumer selection, and then performs the corresponding function.

In decision block 310, the routine 300 determines if the consumer selected the option of having the first gift card returned (e.g., rejecting the buy-back value). If so, and the consumer inserted the first gift card into the kiosk via a card input slot, the routine 300 proceeds to block 312 and the first gift card can be returned to the consumer from an output device, such as the card dispenser 108 described in FIG. 1. In one aspect of this embodiment, however, if the server indicates the first gift card is stolen or fraudulent, the first gift card can be retrieved and deactivated via a card deactivation system such as the card deactivation system 118 described in FIG. 1.

If the consumer did not want the gift card returned, the routine 300 proceeds to decision block 314, and determines if the consumer wishes to exchange the first gift card for cash. If so, the routine 300 proceeds to block 316 and the kiosk dispenses cash using a currency dispenser. In other embodiments, the kiosk can dispense cash value (e.g., a redeemable cash voucher, cash card, etc.) using a voucher printer, a card dispenser, or another suitable output device.

If the consumer does not wish to exchange the first gift card for cash, the routine 300 proceeds to decision block 318 and determines if the consumer wishes to exchange the first gift card for a second gift card. The routine 300 can also proceed to decision block 318 after dispensing cash or a redeemable cash voucher (block 316) to determine if the consumer also wishes to purchase second gift card. If so, a display screen can display information and/or images related to gift cards in a virtual gift card inventory stored in a database, such as described above with reference to FIGS. 1 and 2. The display can include information associated with each gift card, such as the store name, value, etc. The consumer can browse the virtual gift card inventory and select a second gift card using the user interface.

After receiving the consumer's selection of a second gift card, the routine 300 proceeds to block 320. The kiosk can print and/or write information associated with the second gift card with a printer or card writer. The kiosk can then dispense the second gift card with a card dispenser, such as the card dispenser 108 described above, and activate the second gift card via a communications link connecting the kiosk to a database or a merchant system. If the first gift card has a buy-back value that is less than the resale value of the second gift card, the kiosk can prompt the consumer to input additional funds. Additional funds (e.g., credit/debit card, cash) can be deposited by entering credit and/or debit card information into the user interface, swiping a credit/debit card through a card swipe, inserting a credit/debit card in a card input slot, or depositing cash into a currency acceptor. Conversely, if the first gift card has a higher buy-back value than the second gift card, the kiosk can dispense a redeemable cash voucher from the voucher printer, cash from a currency dispenser, a different form of cash value from another output device, and/or prompt the consumer to select a third gift card. The routine 300 can repeat if the consumer has multiple gift cards to exchange. The routine 300 can also include dispensing a receipt from a receipt dispenser after each transaction.

In further embodiments, the routine 300 can include additional steps. For example, the routine 300 can identify the consumer by requesting the consumer to enter credit/debit card information via the card reader and/or the user interface. As explained in greater detail below, this can prevent fraud because the kiosk can connect to the consumer's financial institution via a communications link and verify that the consumer has not been making unauthorized charges. Additionally, requesting the consumer to enter credit/debit card information allows the kiosk to store consumer information (e.g., consumer name, transaction history) to track future transactions. In still further embodiments, the routine 300 can include displaying a customization option so the consumer can personalize a gift card by adding graphics (e.g., text, fonts, pictures).

Turning next to the routine 330 in FIG. 3B, a person wishing to purchase a gift card selects a corresponding button or icon on the user interface of the kiosk. In block 332, a display screen on the kiosk displays information and/or images related to gift cards in a virtual gift card inventory. As described above, the virtual gift card inventory can include gift card information (e.g., gift card identifiers, face values, store names, etc.) from previously exchanged gift cards. The consumer can browse the inventory with a user interface using desired search parameters (e.g., retail establishment, price, discount, etc.). In block 334, the kiosk can receive a first gift card selection from the consumer via the user interface. In further embodiments, the routine 330 can include receiving a plurality of gift card selections at one time.

In block 336, the kiosk receives payment from the consumer via, for example, a cash input slot and/or a card reader. The kiosk can receive different forms of payment, such as cash, a previously exchanged gift card (i.e., routine 300), a debit card, a credit card, and/or other suitable payment mechanisms. In block 328, a card printer and/or a card writer can print and/or write the first gift card information (e.g., a gift card identifier, a store name, etc.) on a first gift card and/or to a magnetic stripe on the first gift card, and a card dispenser can dispense the first gift card. Additionally, in this step, the first gift card can be activated via the communications link described above in reference to FIG. 2. In block 340, the virtual gift card inventory is updated by removing the first gift card information from the virtual gift card inventory. Additionally, a receipt can be dispensed from a receipt dispenser after each transaction.

As described with reference to routine 300, additional embodiments of the routine 330 can include a customization option and/or request the consumer to enter credit/debit card information to identify the consumer.

Figure 4:
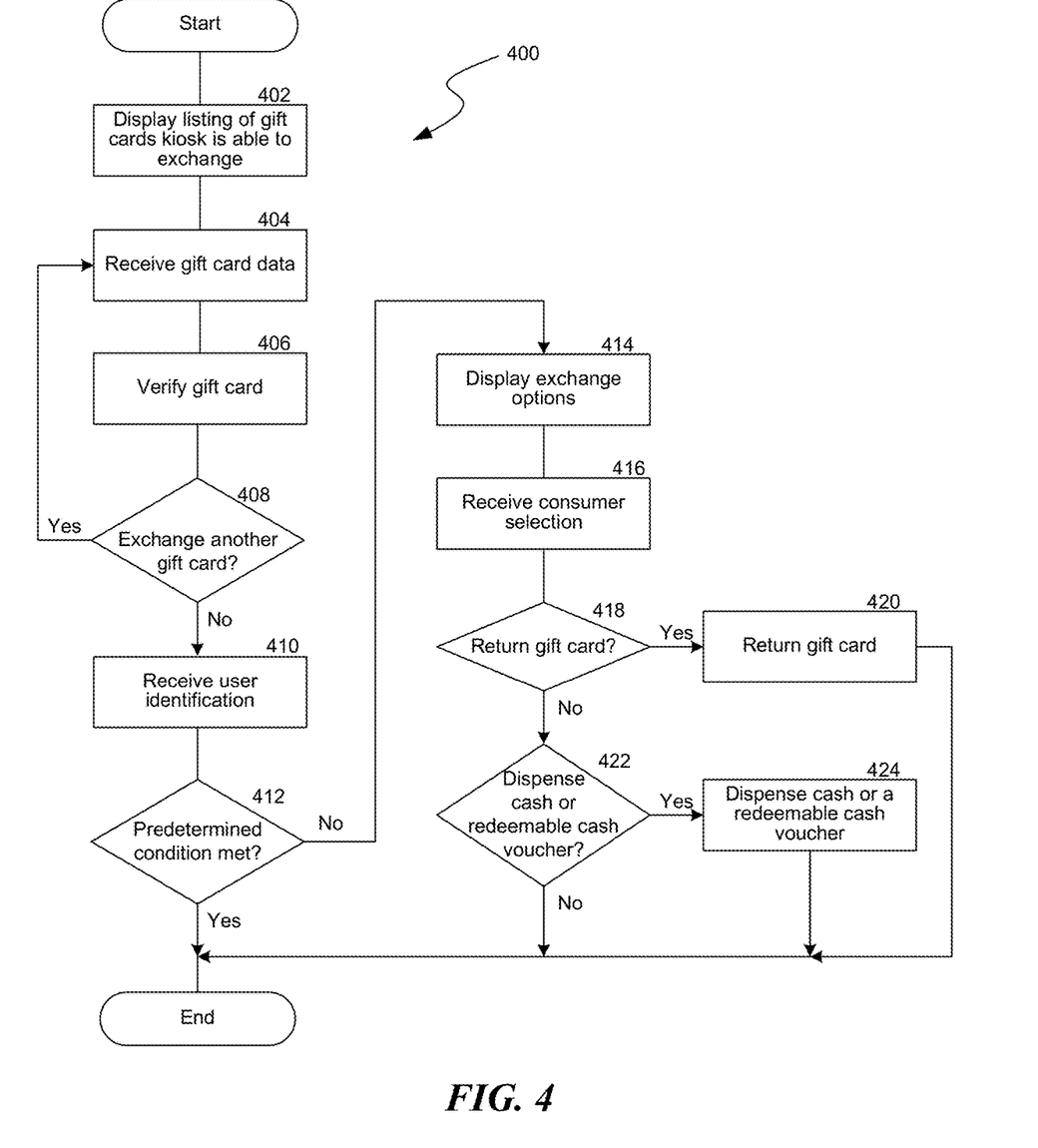
FIG. 4 is a flow diagram of a routine for exchanging multiple gift cards with a consumer operated kiosk configured in accordance with a further embodiment of the disclosure.

FIG. 4 is a flow diagram of a routine 400 for exchanging multiple gift cards for other value (e.g., cash or a redeemable cash voucher) with a consumer operated kiosk (e.g., the kiosk 100) in accordance with another embodiment of the disclosure. The routine 400 can begin in block 402 by displaying (e.g., on a display screen or a touch screen) a listing of gift cards the kiosk will purchase from consumers. In various embodiments, for example, the kiosk can be configured to purchase gift cards from only specified retail establishments, above a predetermined face value, and/or having other suitable limitations. A user can scroll through the listing and/or search the listing for the specific gift card he or she wishes to exchange. The kiosk can also be configured to display additional information associated with the gift cards, such as the return percentage on the face value of the gift cards.

If the user decides to exchange a gift card, the routine 400 moves to block 404 and the kiosk can receive data associated with a first gift card (e.g., a first gift card identifier) from a user by swiping the first gift card through a card swipe or inserting the first gift card into a card input slot. In the case of virtual gift cards, the kiosk can request that the user input the gift card number, code, etc., scan a bar code associated with the first gift card, and/or position a smart phone within a near field of the kiosk to interact with the smart phone and identify the gift card. In block 406, the kiosk can verify the first gift card data by connecting to a gift card database or a merchant system (e.g., via the communications link 202 described in FIG. 2) to check the face value of the first gift card, its card activation status, and/or other relevant information.

In decision block 408, the kiosk queries the user as to whether he or she has additional gift cards to exchange. If so, the routine 400 can repeat blocks 404 and 406 by receiving and verifying additional gift card information until the user has no more gift cards to exchange. Each gift card can be held in its current state (e.g., active or pending) while additional gift cards are validated. In various embodiments, the routine 400 may have a predetermined limit on the maximum monetary value and/or quantity of gift cards that can be exchanged per transaction. If such a limit is met during the transaction, the routine 400 can be configured to automatically terminate or proceed forward to the next step.

The routine 400 can optionally include block 410 where the kiosk can receive user identification information to concatenate a user with the transaction. Suitable user identification can include, for example, a government issued I.D. (e.g., a driver's license, passport, etc.), a debit or credit card, a PIN, a login name and password associated with an account registered with the kiosk or a network of kiosks, and/or other suitable user-specific information that can differentiate the user from other users. Various input devices, such as a scanner (e.g., a bar code scanner that can scan bar codes on drivers' licenses), a card reader, a keypad, and/or other suitable input devices can be used to enter the user identification information. When the kiosk is configured to receive user identification in the form of a government issued I.D., for example, the kiosk can scan the photo, address, barcode, and/or otherwise record suitable information.

The routine 400 can further include determining whether a predetermined condition associated with the user identification information and/or the transaction has been met (decision block 412). When the user identification is a credit or debit card is used, for example, the kiosk can communicate with the user's financial institution (e.g., using the communications link 202 described in FIG. 2) to verify that the user has not been making unauthorized charges, and the routine 400 can terminate if such charges have been made. In other embodiments, the user identification can be stored in a local or remote database to track the user's transactions on the kiosk and/or other remote kiosks connected thereto via the communications link. If the user has exceeded a maximum face value or buy-back of exchanged gift cards within a predetermined period of time (e.g., a daily cap on the total amount of gift card value that can be exchanged or a total transaction value) at the kiosk or a network of kiosks, the routine 400 can prevent the user from exchanging additional gift cards by terminating the routine 400. In various embodiments, this step can also be performed each time an additional gift card is tendered (e.g., rather than after all the gift cards are tendered). The routine 400 can also be discontinued if it indicates suspicious transactions linked to the user, such as excessive quantities of gift card exchanges in the current transaction or in previous transactions, or when excessive face values of gift cards are attempting to be exchanged. Accordingly, the routine 400 can use the user identification information to mitigate fraudulent transactions.

If the transaction or user identification information does not trigger any of the predetermined conditions, the routine 400 proceeds to block 414 and displays exchange options to the user. As discussed above, suitable exchange options can include exchanging one or more of the tendered gift cards for cash or a redeemable cash. In various embodiments, the exchange options may include an accumulated buy-back value associated with the total face value of the gift cards tendered. The exchange options can also separate individual buy-back values for each tendered gift card such that the user has the option to exchange a subset of the tendered gift cards and retrieve others he or she does not wish to exchange. In other embodiments, the kiosk can provide the buy-back value to the user after each gift card is tendered (i.e., before decision block 408), query the user whether he or she would like to accept or reject the exchange, and then query the user whether he or she has another gift card to exchange. The routine 400 can then repeat the verification of each gift card the user wishes to exchange and provide a buy-back value or other exchange option to the user before the next gift card is verified.

In decision block 418, the routine 400 determines if the user selected the option of returning the one or more of the tendered gift cards. If so, the routine 400 can proceed to block 420 and one or more of the gift cards can be physically returned to the user from a card dispenser if the cards were inserted into the kiosk and/or the status of the returned gift cards can be updated appropriately in the gift card database or merchant system (e.g., changed from pending to active, maintained as active, etc.).

If the user did not select to retrieve all of the gift cards, the routine 400 proceeds to decision block 422, and determines if the user selected to exchange one or more of the gift cards for cash or a redeemable cash voucher. If so, the routine 400 proceeds to block 424 and the kiosk dispenses cash using a currency dispenser or prints a redeemable cash voucher. If the gift cards the user wishes to exchange have not yet been received by the kiosk, such as when the user enters the gift card information without inserting the gift cards into the kiosk (e.g., by swiping magnetic stripes on the gift cards), the kiosk can request that the user insert the gift cards into the kiosk via a card acceptor before the kiosk dispenses cash or a redeemable cash voucher. In some embodiments, the kiosk can request that the gift cards are inserted into the kiosk in the order in which they were verified, and may provide guidance as to the order (e.g., by displaying the retailer, value and/or other information associated with each gift card in the order the gift cards were verified). The routine 400 can then terminate or begin again if the user wishes to perform additional transactions using the kiosk.

The routine 400 can also include additional steps, such as those described above with reference to FIGS. 3A and 3B. The routine 400 can also be configured to retain the exchanged gift cards in a storage device. The exchanged gift cards can then be sold remotely, such as on a website for selling discounted gift cards (i.e., less than the face value of the gift cards) or from another kiosk. In one embodiment, the gift cards can be removed from the kiosk and provided to the remote purchasers. In other embodiments, the gift card identifiers can be associated with new gift cards (physical or virtual) and provided to the purchasers via email, smart phone application, mail, etc. In further embodiments, the gift cards can be voided and removed from the stream of commerce. The exchanged gift cards, for example, can be deactivated via the communications link, physically destroyed (e.g., shredded) within the kiosk, or removed from the kiosk and voided.

From the foregoing, it will be appreciated that specific embodiments of the invention have been described herein for purposes of illustration, but that various modifications may be made without deviating from the spirit and scope of the disclosure. The various steps in the routine 400 illustrated in FIG. 4, for example, can be varied such that the routine 400 requests the user's identification information before receiving gift card data. Aspects of the invention described in the context of particular embodiments may be combined or eliminated in other embodiments. Various stages in the routines described in FIGS. 3A-4, for example, can be combined, supplements intermixed, and/or eliminated. Further, while advantages associated with certain embodiments of the invention have been described in the context of those embodiments, other embodiments may also exhibit such advantages, and no embodiment need necessarily exhibit such advantages to fall within the scope of the invention. Accordingly, the invention is not limited, except as by the appended claims.

We claim:

1. A method of exchanging gift cards for value with a consumer operated kiosk, the method comprising:
- receiving, at the consumer operated kiosk, a gift card identifier via a card reader associated with the consumer operated kiosk, wherein the gift card identifier is associated with a gift card received from a user;
- verifying, by the consumer operated kiosk and via interactions with a remote server and at least one database, a card activation status and a gift card value associated with the gift card identifier;
- displaying one or more exchange options to the user via a display associated with the consumer operated kiosk, wherein at least one of the exchange options includes returning the gift card or exchanging the gift card value for a redeemable cash voucher having a buy-back value, wherein the buy-back value is less than the gift card value;
- receiving, at the kiosk and via the display, a selection from the user corresponding to at least one of the exchange options; and
- when the user selection corresponds to exchanging the gift card value for the redeemable cash voucher, issuing, by the kiosk, the redeemable cash voucher to the user.

2. The method of claim 1 wherein the user is a first user, and wherein the method further comprises reselling the gift card value to a second user for a price less than the gift card value and more than the buy-back value.

3. The method of claim 1 wherein issuing the redeemable cash voucher to the user comprises electronically sending the redeemable cash voucher to the user via an email and/or to a mobile device via a smartphone application.

4. The method of claim 1, further comprising:
- scanning a government issued I.D. from the user via the card reader; and
- associating the government issued I.D. with user and at least one of the gift card identifier or the redeemable cash voucher in a database.

5. The method of claim 1, further comprising:
- receiving user identification information via a user input device of the consumer operated
- kiosk, wherein the user identification information associates the user with the gift card identifier; and
- determining whether the user identification information meets a preset condition before issuing the redeemable cash voucher to the user.

6. The method of claim 5 wherein determining whether the identification information meets the preset condition comprises comparing a total value of gift cards tendered by the user within a preset period of time to a preset limit on total gift card value.

7. A method of exchanging gift cards for value with a consumer operated kiosk, the method comprising:
- receiving, at the consumer operated kiosk, a gift card from a first user via a card reader associated with the consumer operated kiosk, wherein the card reader reads a gift card identifier from the gift card;
- verifying, by the consumer operated kiosk and via interactions with a remote server and at least one database, a card activation status and a gift card value associated with the gift card identifier;
- displaying one or more exchange options for the first user via a display associated with the consumer operated kiosk, wherein the one or more exchange options include returning the gift card or exchanging the gift card value for a buy-back value in the form of cash and/or a redeemable cash voucher, wherein the buy-back value is less than the gift card value;
- receiving, at the kiosk and via the display, a selection from the first user corresponding to at least one of the exchange options;
- when the user selection corresponds to exchanging the gift card for cash and/or a redeemable cash voucher, issuing, by the kiosk, the selected cash and/or redeemable cash voucher to the first user; and
- reselling the gift card value to a second user for a price less than the gift card value and greater than the buy-back value.

8. The method of claim 7 wherein issuing the redeemable cash voucher to the first user comprises electronically sending the redeemable cash voucher to the first user via an email and/or to a mobile device via a smartphone application.

9. The method of claim 7, further comprising receiving the gift card in a card input slot at the consumer operated kiosk and retaining the gift card in the consumer operated kiosk prior to issuing the selected cash and/or redeemable cash voucher to the user.

10. The method of claim 7, further comprising:
- scanning a government issued I.D. for user identification information via the card reader; and
- associating the user identification information with the gift card identifier in a database.

11. A method of exchanging gift cards for value with a consumer operated kiosk, the method comprising:
- receiving, at the consumer operated kiosk, a first gift card identifier via a user interface at the consumer operated kiosk, wherein receiving the first gift card identifier includes reading the first gift card identifier from a first gift card via a card reader at the consumer operated kiosk, wherein the first gift card identifier is associated with a gift card received from a user;
- verifying, by the consumer operated kiosk and via interactions with a remote server and at least one database, a first activation status and a first gift card value associated with the first gift card identifier;
- receiving, at the consumer operated kiosk, a second gift card identifier from the user via the user interface, wherein the second gift card identifier is associated with a second gift card;
- verifying, by the consumer operated kiosk and via interactions with a remote server and at least one database, a second activation status associated and a second gift card value with the second gift card identifier;
- maintaining the first activation status while the second gift card identifier is received and the second activation status is verified;
- displaying one or more exchange options to the user, via a display associated with the consumer operated kiosk, wherein the one or more exchange options include returning the first gift card, returning the second gift card, and exchanging the gift card value for a redeemable cash voucher;
- receiving, at the kiosk and via the display, a selection from the user corresponding to at least one of the exchange options; and
- when the user selection corresponds to exchanging the gift card value for the redeemable cash voucher, issuing, by the kiosk, the redeemable cash voucher to the user.

12. The method of claim 11 wherein the gift card value is equal to a first value of the first gift card plus a second value of the second gift card.

13. The method of claim 11 wherein the user is a first user, and wherein the method further comprises reselling at least a portion of the gift card value to a second user for a price less than the gift card value.

14. The method of claim 11 wherein issuing the redeemable cash voucher to the user comprises electronically providing the redeemable cash voucher to the user via an email and/or a smartphone application.

15. The method of claim 11 wherein the first gift card has a first gift value and the second gift card has a second gift card value, wherein the redeemable cash voucher has a voucher value, and wherein the voucher value is based on the sum of the first and second gift card values.

16. The method of claim 11 wherein displaying one or more exchange options includes displaying a first buy-back offer associated with the first gift card value and a second buy-back offer associated with the second gift card value.

17. The method of claim 11, further comprising:
scanning a government issued I.D. from the user via the card reader; and
associating the government issued I.D. with the user and the gift card identifier and/or the redeemable cash voucher in a database.

18. The method of claim 11, further comprising receiving, via a card input slot, the first and second gift cards in the consumer operated kiosk when the user selection corresponds to exchanging the first gift card and second gift card for a redeemable cash voucher.

19. The method of claim 11, further comprising reselling the gift card value from a location remote from the consumer operated kiosk, wherein the gift card value is resold for a price less than the gift card value.

20. The method of claim 11 wherein receiving the second gift card identifier associated with the second gift card comprises receiving gift card information associated with a virtual gift card.

\* \* \* \* \*